US 9,067,267 B2

(12) United States Patent
Brown et al.

(10) Patent No.: US 9,067,267 B2
(45) Date of Patent: Jun. 30, 2015

(54) CUTTING MACHINE WITH BLADE CLAMP

(75) Inventors: Warren Brown, Mount Evelyn (AU); Graham Gerhardt, Warrandyte (AU); Harry Szommer, Carrum Downs (AU); Cikuan Jin, Suzhou (CN); Mingming He, Suzhou (CN); Baoling Gong, Suzhou (CN)

(73) Assignee: POSITEC POWER TOOLS CO., LTD., Suzhou, Jiangsu (CN)

( * ) Notice: Subject to any disclaimer, the term of this patent is extended or adjusted under 35 U.S.C. 154(b) by 334 days.

(21) Appl. No.: 13/389,425

(22) PCT Filed: Aug. 9, 2010

(86) PCT No.: PCT/CN2010/075798
§ 371 (c)(1),
(2), (4) Date: Feb. 7, 2012

(87) PCT Pub. No.: WO2011/015158
PCT Pub. Date: Feb. 10, 2011

(65) Prior Publication Data
US 2012/0132050 A1    May 31, 2012

(30) Foreign Application Priority Data

Aug. 7, 2009  (CN) .......................... 2009 1 0163870
Sep. 3, 2009  (CN) .......................... 2009 1 0173616
Sep. 22, 2009 (CN) .......................... 2009 1 0178066

(51) Int. Cl.
*B23D 49/08*   (2006.01)
*B23D 51/08*   (2006.01)
(Continued)

(52) U.S. Cl.
CPC .............. *B23D 49/08* (2013.01); *B26D 7/2614* (2013.01); *B23D 51/02* (2013.01); *B23D 51/08* (2013.01)

(58) Field of Classification Search
CPC ........ B23D 49/08; B23D 51/02; B23D 51/08; B23D 51/12; B23D 51/14; B26D 1/10; B26D 7/26; B26D 7/2614
USPC ......... 83/697, 699.21, 662, 698.71, 746, 781, 83/783
IPC ................................ B23D 49/08, 51/02, 51/08
See application file for complete search history.

(56) References Cited

U.S. PATENT DOCUMENTS 4,186,784 A    2/1980  Stone
6,267,038 B1   7/2001  O'Banion et al.
(Continued)

FOREIGN PATENT DOCUMENTS

AU   2007100342 A   6/2007
CN   200970657 Y   11/2007
(Continued)

*Primary Examiner* — Clark F Dexter
(74) *Attorney, Agent, or Firm* — Fulwider Patton LLP

(57) ABSTRACT

A worktable including an opening and an upper surface for supporting a workpiece; a supporting unit for supporting the worktable; a cutting mechanism mounted on a lower surface of the worktable and contained within the supporting unit including: a motor for outputting a rotation motion; a reciprocating rod driving a saw blade moving reciprocately through the opening; a motion conversion mechanism converting the rotation motion of the motor into a reciprocating motion of the reciprocating rod; and a saw blade clamp for clamping and releasing the saw blade; the saw blade clamp including an operating element which is disposed on the external surface of the worktable or the supporting unit.

14 Claims, 19 Drawing Sheets

(51) Int. Cl.
   *B26D 7/26* (2006.01)
   *B23D 51/02* (2006.01)

(56) References Cited

U.S. PATENT DOCUMENTS

| | | | |
|---|---|---|---|
| 6,986,370 B1 * | 1/2006 | Schoene et al. | ............... 144/287 |
| 2007/0272067 A1 | 11/2007 | Chen | |
| 2009/0178531 A1 | 7/2009 | Fuchs et al. | |

FOREIGN PATENT DOCUMENTS

| | | |
|---|---|---|
| CN | 201227702 Y | 4/2009 |
| CN | 101573202 A | 11/2009 |
| CN | 201471000 U | 5/2010 |
| CN | 201483084 U | 5/2010 |
| DE | 199 25 749 A1 | 12/2000 |
| DE | 202007007131 | 7/2007 |
| DE | 102006062000 A | 7/2008 |
| DE | 102007052432 A1 | 5/2009 |
| EP | 0934789 A | 8/1999 |
| EP | 2106317 A | 7/2008 |
| FR | 2001722 | 12/2007 |
| GB | 2076737 A | 12/1981 |
| GB | 2438511 A | 11/2007 |
| TW | 429186 B | 4/2011 |
| WO | WO2008/080663 | 7/2008 |

* cited by examiner

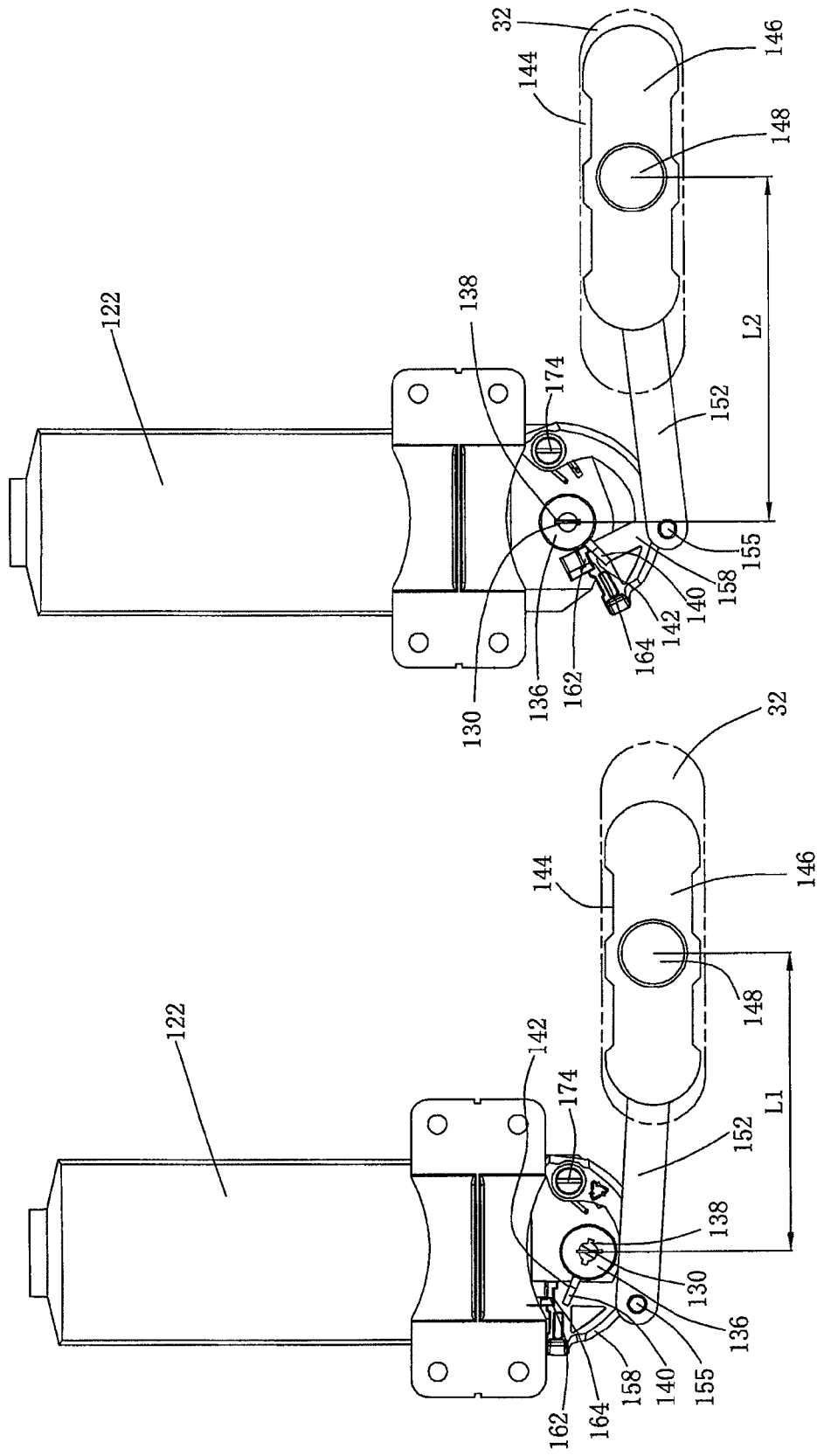

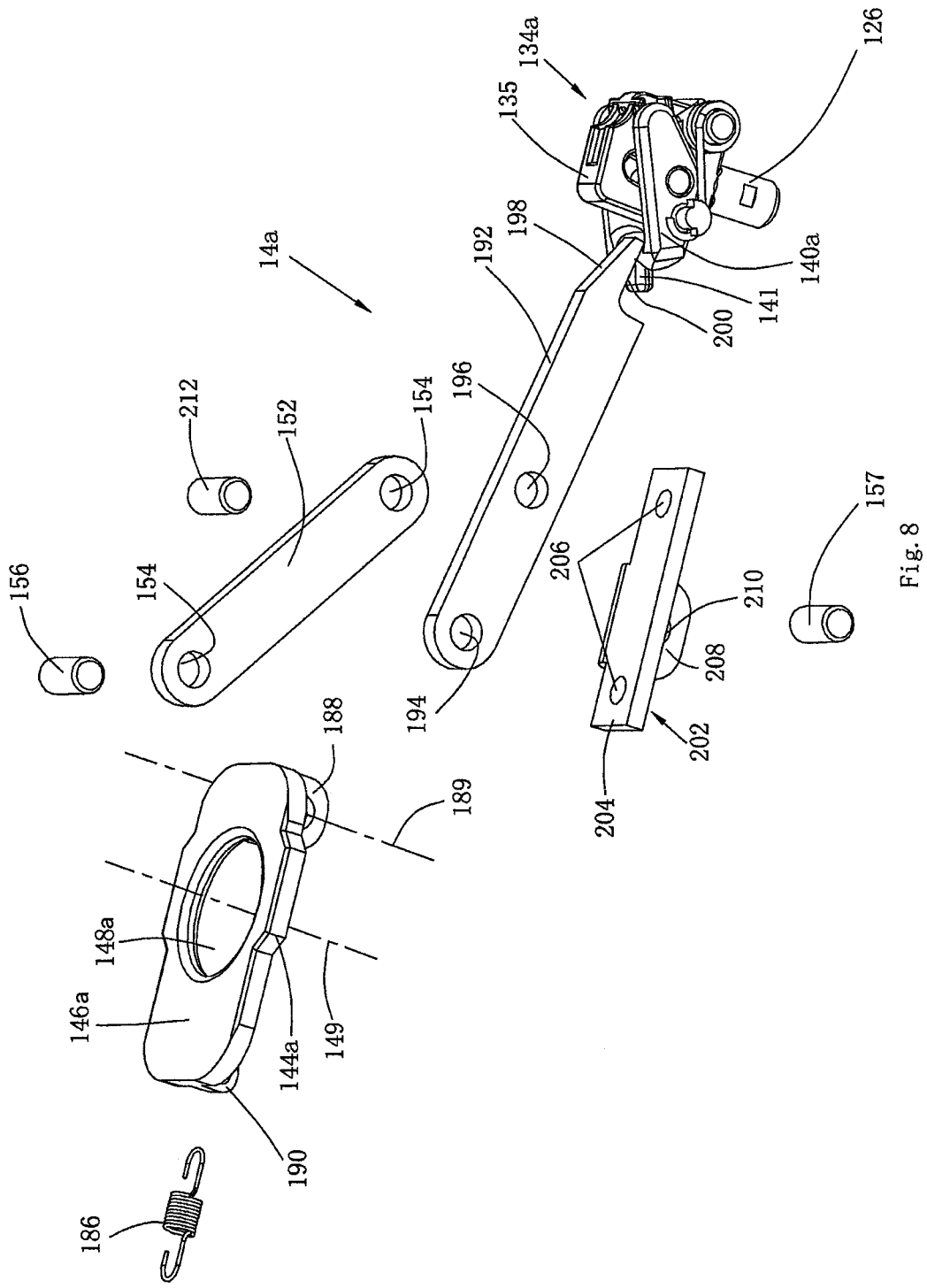

CUTTING MACHINE WITH BLADE CLAMP

TECHNICAL FIELD

The invention relates to a cutting machine, in particular to a cutting machine with a reciprocating cutting mechanism.

BACKGROUND OF THE INVENTION

The existing jig saws are able to carry out all kinds of curved and linear cutting and therefore are widely applied in plate processing of various materials. Usually, a jig saw comprises a motor, a housing holding the motor, a motion conversion mechanism that is housed in the gearbox housing, driven by the motor and converting the rotation motion of the motor into the reciprocating motion of a reciprocating rod, a saw blade connecting to the reciprocating rod via a clamp, and a bottom plate supporting the jig saw body on the surface of a workpiece.

To develop the application, professional staff in this field place the jig saw upside down on the lower surface of a worktable so as to perform cutting when moving the workpiece. However, the current upside-down jig saw is configured by directly turning the jig jaw available in the market and mounting the jig jaw on a worktable with a certain connecting mechanism. During use, the saw clamp of the jig saw is an inseparable structure of the jig saw and is disposed below the worktable together with the jig saw body, so when the saw blade is required to the replaced, the operator is required to stretch out his/her hands below the worktable to operate the clamp so as to replace the saw blade. The operator is required to stoop and try to find the clamp by hand. Therefore, the saw blade is inconvenient to replace, and the operation needs much time and labor.

SUMMARY OF THE INVENTION

One object of the present invention is to provide a cutting machine which is easy to be operated.

In order to realize the above object, the present invention provides a cutting machine, comprising: a worktable including an opening and an upper surface for supporting a workpiece; a supporting unit for supporting the worktable; a cutting mechanism mounted on a lower surface of the worktable and contained within the supporting unit comprising: a motor for outputting a rotation motion; a reciprocating rod driving a saw blade moving reciprocately through the opening; a motion conversion mechanism converting the rotation motion of the motor into a reciprocating motion of the reciprocating rod; and a saw blade clamp assembly for clamping and releasing the saw blade; the saw blade clamp assembly comprises an operating element which is disposed on the external surface of the worktable or the supporting unit.

Comparing to the traditional technology, the present invention fixes the operating element on the worktable or the supporting unit, which brings operation of the saw blade clamp assembly to a convenient position for an operator, and the process of replacing the saw blade is very easy.

As a further improvement of the above proposal, the operating element is disposed on the upper surface of the worktable.

As a further improvement of the above proposal, the saw blade clamp assembly comprises a clamping wrench rotating around a reciprocating rod axis of the reciprocating rod, a linkage mechanism disposed between the operating element and the clamping wrench, and thus the operating element is operable to rotatably drive the clamping wrench.

As a further improvement of the above proposal, the linkage mechanism comprises a connecting plate connected to the operating element and rotating around a rotating axis which is parallel to the reciprocating rod axis, and an actuating element being connected to the connecting plate and movable to drive the clamping wrench.

As a further improvement of the above proposal, the rotating axis of the connecting plate is parallel to the rotating axis of the actuating element.

As a further improvement of the above proposal, the rotating axis of the connecting plate rotates around the rotating axis of the actuating element.

As a further improvement of the above proposal, the actuating element comprises a rotating frame being disposed rotatably with respect to the reciprocating rod, the rotating frame comprises a C-shape base portion, a connecting shaft is disposed at one end of the base portion, a pushing column which extends vertically is disposed at the other end of the base portion, and a connecting lug is disposed between the two ends of the base portion.

As a further improvement of the above proposal, the height of the pushing column is larger than a reciprocating travel of the reciprocating rod.

As a further improvement of the above proposal, a stop protrusion is disposed on the pushing column, so that when the clamping wrench contacts with a biasing surface of the pushing column, the stop protrusion would prevent the clamping wrench from leaving the biasing surface.

As a further improvement of the above proposal, the saw blade clamp assembly further comprises an elastic element that biases the operating element to move towards a clamping position at which the saw blade is clamped.

As a further improvement of the above proposal, the elastic element is a tension spring which is disposed between the worktable and the operating element, the tension spring is tensible along the moving direction of the operating element.

As a further improvement of the above proposal, the saw blade clamp assembly comprises a clamping wrench rotating around a reciprocating rod axis of the reciprocating rod, an actuating element being connected to the operating element and movable to drive the clamping wrench, the cutting mechanism comprises a gearbox housing, the elastic element is a torsion spring which is disposed between the actuating element and the gearbox housing, the torsion spring biases the actuating element to rotate towards a clamping position at which the saw blade is clamped.

As a further improvement of the above proposal, the operating element is translationally movable to the worktable.

As a further improvement of the above proposal, a sliding groove is disposed on the worktable, the operating element comprises a sliding plate, the sliding plate is operable to move along the sliding groove between a releasing position where the saw blade is released and a clamping position where the saw blade is clamped.

As a further improvement of the above proposal, the operating element comprises an opening disposed on the sliding plate.

As a further improvement of the above proposal, the saw blade clamp assembly comprises a clamping wrench rotating around a rotating axis which is vertical to the reciprocating rod axis of the reciprocating rod, and a linkage mechanism being disposed between the operating element and the clamping wrench.

As a further improvement of the above proposal, the linkage mechanism comprises a connecting plate connected to the operating element and rotating around a rotating axis which is vertical to the reciprocating rod axis, and an actuating element connected to the connecting plate and movable to drive the clamping wrench.

As a further improvement of the above proposal, the actuating element comprises a pressing pole, a pivot hole is disposed at one end of the pressing pole, the pressing pole is rotatably mounted on the worktable or the base, a pressing portion is disposed at the other end of the pressing pole, the connecting plate connects to the middle portion of the pressing pole by a pin, the pressing portion is driven by the connecting plate and rotated around the pivot hole for moving the clamping wrench.

As a further improvement of the above proposal, a product which a distance from the center of the pivot hole to the pressing surface of the pressing portion multiplies a sine of a rotating angle that the pressing pole rotates around the pivot hole is larger than a reciprocating travel of the reciprocating rod.

As a further improvement of the above proposal, the operating element is rotatable relative to the worktable.

As a further improvement of the above proposal, the saw blade clamp assembly comprises a clamping wrench rotating around a rotating axis which is vertical to the reciprocating rod axis of the reciprocating rod, an actuating element is pivotally disposed between the operating element and the clamping wrench.

As a further improvement of the above proposal, the operating element and the actuating element are rotatable around a same pivot shaft.

In order to realize the above object, the present invention provides a cutting machine, comprising: a worktable including an opening and an upper surface for supporting a workpiece; a supporting unit for supporting the worktable; a cutting mechanism mounted on a lower surface of the worktable and received in the supporting unit comprising: a motor for outputting a rotation motion; a reciprocating rod driving a saw blade moving reciprocally through the opening; a motion conversion mechanism converting the rotation motion of the motor into a reciprocating motion of the reciprocating rod; and a saw blade clamp assembly for clamping and releasing the saw blade; the saw blade clamp assembly comprises a flexible connecting element which is operably movable to drive the saw blade clamp assembly between a clamping position where the saw blade is clamped and a releasing position where the saw blade is released.

Comparing to the traditional technology, the present invention provides a flexible connecting element, which provides for a releasing operation and clamping operation of the saw blade clamp assembly at a position where it is easy for the operator to touch without searching by hands, then the operator would replace the saw blade expediently.

As a further improvement of the above proposal, the flexible connecting element is a steel wire. The steel wire has certain rigidity and toughness and ensures that the operating device of the saw blade clamp assembly is positioned at a position where the operator can easily reach.

As a further improvement of the above proposal, a foot pressing plate is disposed under the worktable and connected to the flexible connecting element. So the operator is able to control the saw blade clamp assembly by pedaling and avoid stooping.

As a further improvement of the above proposal, the saw blade clamp assembly comprises a rotating sleeve that can rotate around the reciprocating rod axis of the reciprocating rod, the flexible connecting element converts the rotation of the rotating sleeve into the linear motion of the foot pressing plate. The foot pressing plate performs linear motion, so the operator may easily apply force and the actions of clamping and releasing the saw blade are simple.

As a further improvement of the above proposal, a corner bracket is disposed between the flexible connecting element and the saw blade clamp and is rotatable around the reciprocating rod axis, one end of the flexible connecting element connects with the corner bracket, the other end of the flexible connecting element connects to the foot pressing plate. Due to the corner bracket, the motion of the rotating sleeve is more easily converted into the movement of the foot pressing plate and more easily ensures that the clamp is configured into the released or clamped state.

As a further improvement of the above proposal, the corner bracket comprises a C-shaped base portion, one end of the base portion is connected with the rotating shaft, the other end of the base portion is provided with a pushing column which extends vertically, a connecting lug is disposed between the two ends of the base portion, and the flexible connecting wire is penetrated into the connecting lug. The pushing column pushes the rotating sleeve of the clamp, and the whole corner bracket rotates around the rotating shaft, to ensure that the steel wire is able to pull the corner bracket to rotate.

As a further improvement of the above proposal, the cutting machine comprises a supporting frame with a supporting surface and at least three supporting legs, the foot pressing plate is disposed at the lower side of one of the supporting legs, the foot pressing plate is able to move axially with respect to the supporting leg. The supporting unit of the cutting machine is positioned on the supporting surface of the supporting frame, the supporting legs support the cutting machine, so the saw blade is positioned at a position where the operator works comfortably and controls the saw blade clamp assembly with his or her feet conveniently.

As a further improvement of the above proposal, the steel wire penetrates through the supporting surface and is at least partly received into the supporting leg. Therefore, the whole cutting machine has no flexible connecting element outside and is compactly structured and the steel wire is difficult to break or deform in case of misoperation.

As a further improvement of the above proposal, the foot pressing plate comprises the footplate and a moving block which receives in the supporting leg. The footplate is connected with the moving block via the rotating shaft. Therefore the footplate is able to rotate with respect to the moving block, when the saw blade is not required to be clamped or released, the footplate is able to rotate with respect to the moving block to the position where the footplate is adhered to the outer wall of the supporting leg. At this moment, the footplate is inoperable so as to avoid the event that the operator carelessly steps on the footplate and releases the saw blade.

As a further improvement of the above proposal, an elastic element received in the supporting leg is positioned between the footplate and the moving block, pressing the moving block to move towards the position wherein the steel wire is unloosened. Therefore, the saw blade clamp assembly is kept at the clamped position at the normal state.

One object of the present invention is to provide a cutting machine which the saw blade is changed in a safety way.

In order to realize the above object, the present invention provides a cutting machine, comprising: a worktable including an opening and an upper surface for supporting a workpiece; a supporting unit for supporting the worktable; a cutting mechanism mounted on a lower surface of the worktable and received in the supporting unit comprising: a motor for outputting a rotation motion; a reciprocating rod driving a saw blade moving reciprocally through the opening; a motion conversion mechanism converting the rotation motion of the motor into a reciprocating motion of the reciprocating rod; and a saw blade clamp for clamping and releasing the saw blade. The worktable has a transparent portion which is at least occupying a part of the worktable, and the saw blade clamp assembly is positioned below the transparent portion.

Comparing to the traditional technology, the present invention provides a transparent portion on the worktable, then the saw blade clamp assembly can be seen by the operator during replacing the saw blade, and the operator will not be hurt by the saw blade when the operator put his hands under the worktable, which prevents the injury by the misoperation.

As a further improvement of the above proposal, the upper surface of the transparent portion is aligned with the upper surface of the worktable. The transparent portion is one part of the worktable, therefore the transparent portion would not obstruct the workpiece supported on the worktable.

As a further improvement of the above proposal, the area of the transparent portion is equal to the area of the upper surface of the worktable. It is easy to manufacture a worktable which is made of transparent material. Besides, the operator has a large view in the operation of replacing the saw blade, which can avoid injury when the operator is replacing the saw blade at a different position.

As a further improvement of the above proposal, the worktable comprises two portions which are separable, the saw blade clamp is positioned between the boundary of the two portions.

As a further improvement of the above proposal, at least one portion of the worktable is able to move with respect to the saw blade clamp assembly so that the saw blade clamp assembly is positioned to be contacted directly. One portion of the worktable can move away from the saw blade clamp, so the operator can easily to contact the saw blade clamp assembly directly without stooping.

As a further improvement of the above proposal, the two portions of the worktable are able to move with respect to the saw blade clamp assembly at the same time, which can accelerate the separating process, and decrease the operating time to replace the saw blade.

As a further improvement of the above proposal, at least one portion of the worktable is able to translate with respect to the saw blade clamp assembly. One of the worktable and the supporting unit has a guiding rail, the other one has a sliding groove, the worktable is able to slide with respect to the supporting unit. Therefore, the moving process of the worktable is very stable, the variable factors which may affect the worktable are very few, and it is very easy to be operated.

As a further improvement of the above proposal, at least one part of the worktable can rotate with respect to the saw blade clamp assembly. The worktable only needs to be rotated a small angle to discover the saw blade clamp assembly, thus the operator contacts the saw blade clamp assembly directly, and because the worktable only needs to move a short distance, it saves labor by comparing to the traditional manner.

As a further improvement of the above proposal, the worktable is turnable with respect to the supporting unit.

BRIEF DESCRIPTION OF THE DRAWINGS

FIG. 6 is a plan view of the saw blade clamp assembly in FIG. 4;

FIG. 7 is a plan view of the saw blade clamp assembly in FIG. 5;

FIG. 8 is an exploded view of the saw blade clamp assembly of the cutting machine of the second embodiment of the present invention;

DESCRIPTION OF THE PREFERRED EMBODIMENT

Figure 1:
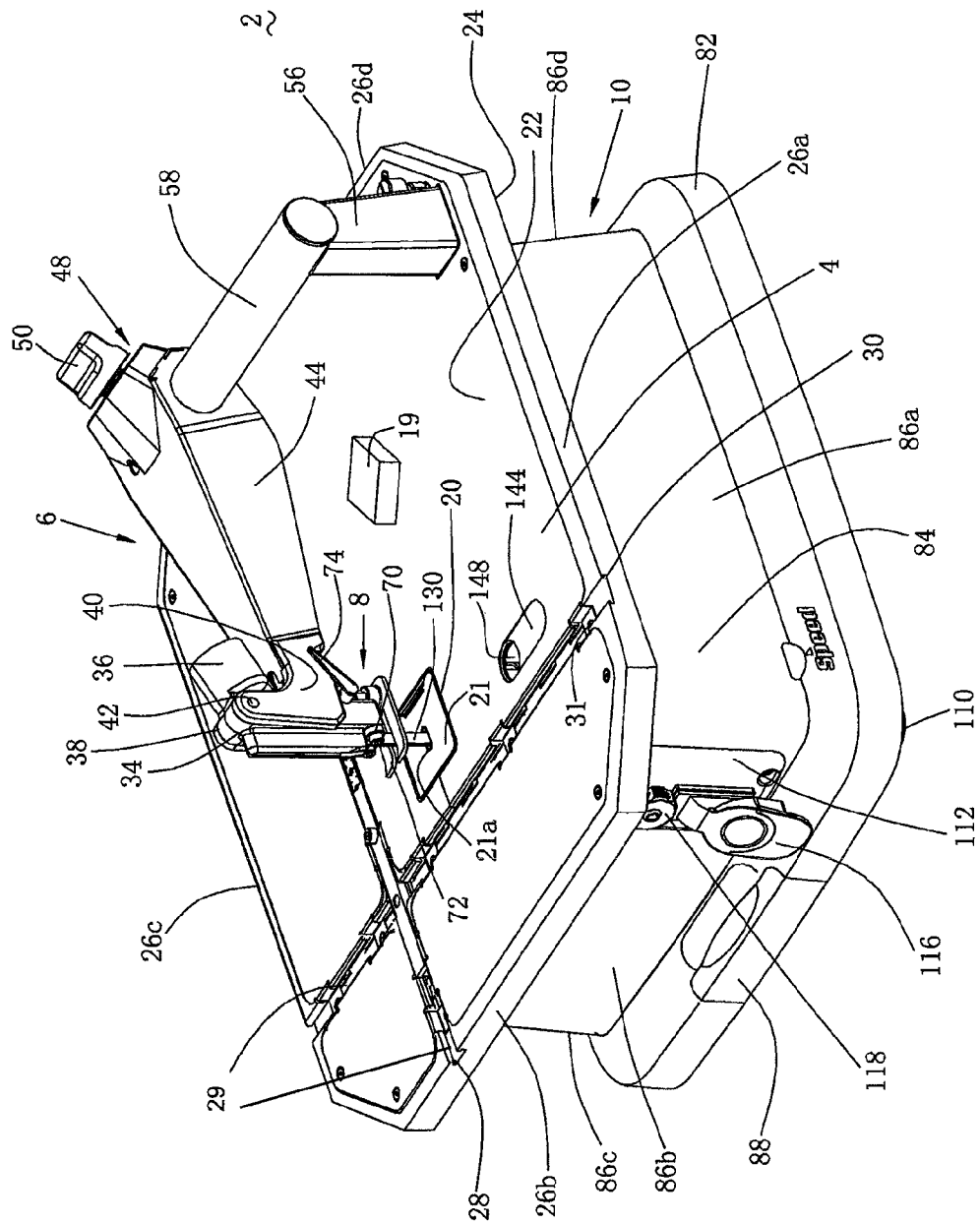
FIG. 1 is a schematic view of the cutting machine of the first embodiment according to the present invention.
Figure 2:
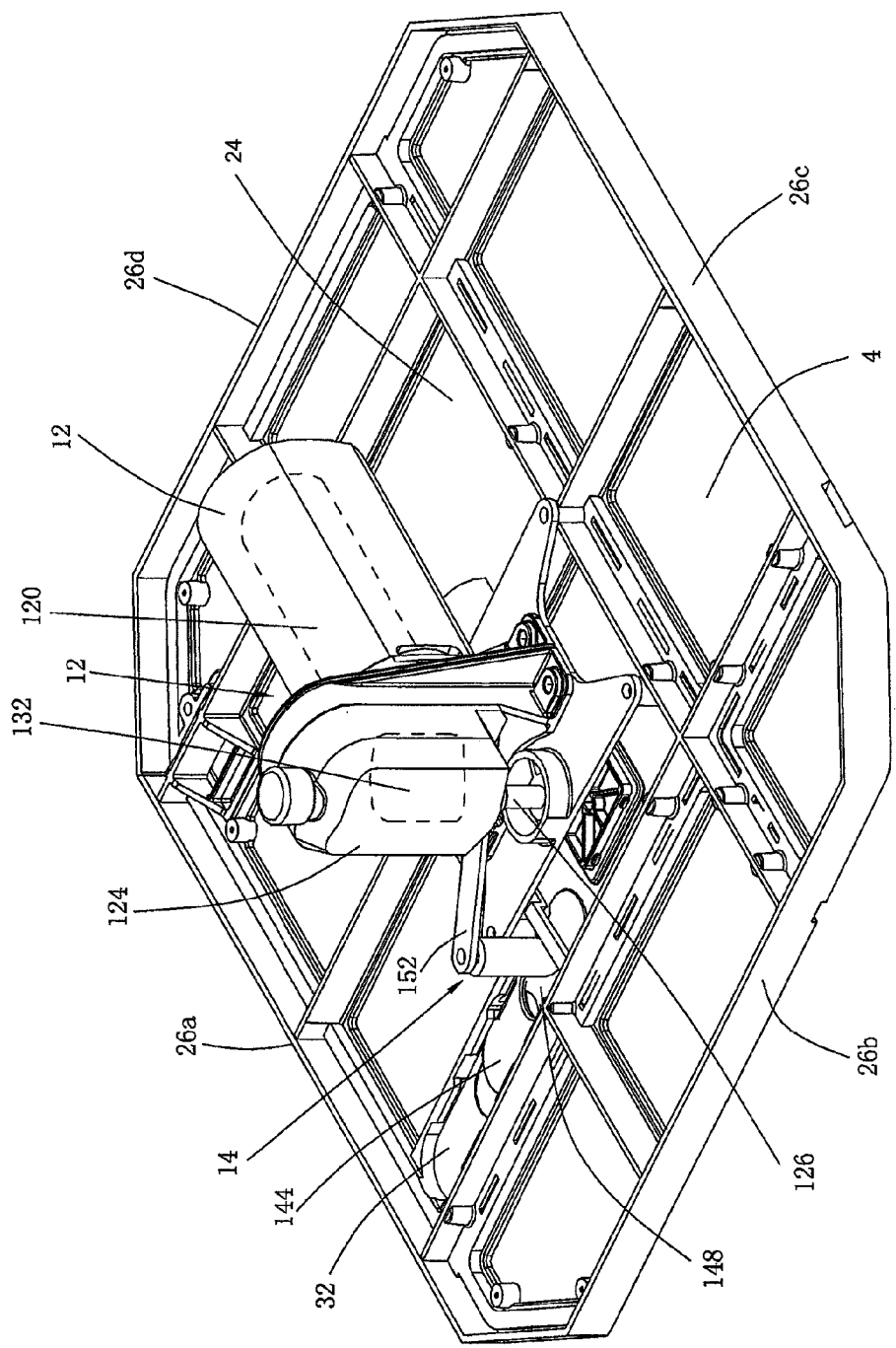
FIG. 2 is a schematic view of the worktable of the cutting machine which is assembled the supporting unit in FIG. 1.
Figure 3:
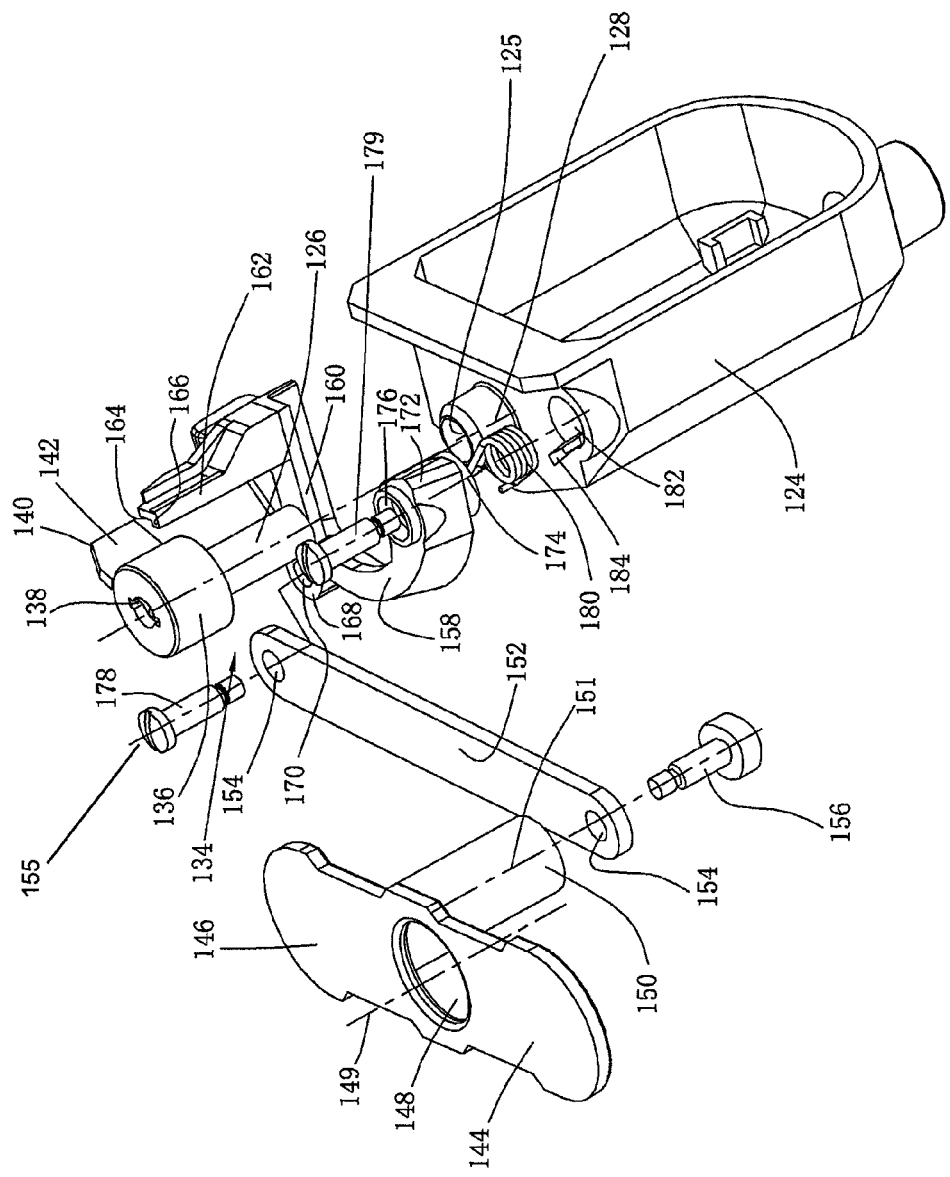
FIG. 3 is an exploded view of the saw blade clamp assembly of the cutting machine in FIG. 1.

Referring to the FIGS. 1-2, a cutting machine 2 comprises a worktable 4, a supporting unit 10 for supporting the worktable 4, a guard assembly 6 disposed on the upper surface 22 of the worktable 4, a pressing plate assembly 8 connecting to the guard assembly 6 and adjustably applying a certain pressure onto a workpiece, and a cutting mechanism 12 disposed on the lower surface 24 of the worktable 4.

According to the use habits of operators, the left side of the FIG. 1 is defined as the front portion of the cutting machine 2, while the right side is defined as the rear portion of the cutting machine 2. The worktable 4 has the upper surface 22, the lower surface 24 and sidewalls 26a, 26b, 26c and 26d that extend vertically with respect to the upper and lower surfaces. The upper surface 22 and the sidewalls 26a, 26b, 26c and 26d compose the outer surface of the worktable 4. An opening 20 is formed on the worktable 4, positioned on the front portion of the cutting machine 2 and running through the upper surface 22 and the lower surface 24 from the top down. A saw blade 130 passes through the opening 20 from the bottom up. A workpiece 19 is capable of being placed on the upper surface 22 of the worktable 4, moving along the upper surface 22 so as to be cut by the saw blade 130. The opening 20 is square. A square blade protecting plate 21 is capable of being embedded into the opening 20 for preventing dust from entering the cutting machine to a certain extent, and when the saw blade 130 is broken, the protecting plate 21 is capable of being dismantled, so the operator can take out the saw blade 130 from the cutting machine. A slot 21a is formed in the middle of the protecting plate 21, and the saw blade 130 passes through the slot 21a.

The worktable 4 is also provided with a longitudinal T-slot 28 and a transverse T-slot 30. The longitudinal T-slot 28 extends from the front portion to the rear portion of the worktable 4. The transverse T-slot 30 is positioned on the front side of the opening 20 and intersected with the longitudinal T-slot 28 to divide the upper surface 22 of the whole worktable 4 into four parts. The transverse T-slot 30 and the longitudinal T-slot 28 respectively extend from sidewalls 26a and 26b of the worktable 4 to reach the other sidewalls 26c and 26d which are respectively disposed in parallel. The cross sections of the longitudinal T-slot 28 and the transverse T-slot 30 are identical and the bottoms 29 thereof are also provided with several through-holes 31 disposed at intervals along the extension direction of the T-slot.

The guard assembly 6 comprises a bracket 56 detachably connected to the worktable, an extending arm 58 horizontal to the bracket, and an extending guard 44 connected with the extending arm 58, left and right guard plates 38, 40 and a guard body 34. A guard clamping mechanism 48 with a clamping knob 50 adjustably fastens the extending guard 44 on the extending arm 58. A guide wheel 70 is disposed below the guard body 34 for guiding the reciprocating motion of the saw blade 130. A dust collecting hose 36 is positioned above the guard body 34 for connecting with a dust collector and collecting the dust generated during cutting. The left and right guard plates are connected with the guard body 34 via a pin shaft 42.

The pressing plate assembly 8 is positioned between the guard assembly 6 and the worktable 4 to realize the height adjustment of a pressing plate 72 with respect to the worktable 4 by rotating an adjusting wrench 74.

The supporting unit 10 comprises a base 82 with several supporting legs 110 and a body 84 with supporting walls 86a, 86b, 86c and 86d. A drawer 88 is positioned at the front portion of the supporting unit 10 for collecting the dust. The front supporting wall 86b of the body 84 is provided with a controlling panel 112 for receiving a main switch 116 and a speed adjusting switch 118 of the cutting machine 2. The supporting walls 86a, 86b, 86c and 86d compose the outer surface of the supporting base 10. In this embodiment, the supporting unit 10 has the supporting wall, however skilled persons in this field should understand that the worktable and the cutting mechanism are capable of being supported by several supporting legs.

Therefore, the supporting unit in the present invention may also be a bracket consisting of supporting legs. The corresponding outer surface of the supporting unit is the outer walls of the supporting legs.

The cutting mechanism 12 is fixed on the lower surface 24 of the worktable 4 and received in the supporting unit 10 and comprises a motor 120 generating rotation motion, a reciprocating rod 126 driving the saw blade 130 that passes through the opening 20 to move reciprocally, a motion conversion mechanism 132 converting the rotation driving of the motor 120 into the reciprocating motion of the reciprocating rod 126, and a saw blade clamp assembly 14 operable to clamp and release the saw blade 130. The saw blade clamp assembly 14 comprises an operating element 144 positioned on the worktable 4 or on the outer surface of the supporting unit 10.

The first embodiment of the saw blade clamp assembly 14 is further described in combination with the attached drawings 1-7.

The cutting machine 2 has the cutting mechanism 12, wherein the cutting mechanism 12 comprises the motor 120, a motor housing 122 receiving the motor 120, and a gearbox housing 124 connected with the housing 122 and receiving the motion conversion mechanism 132. The rotation motion of the motor 120 is converted into the reciprocating motion of a reciprocating rod 126 along a reciprocating rod axis 128 by the motion conversion mechanism 132.

In this embodiment, the saw blade clamp assembly 14 comprises a clamp 134 connected to the reciprocating rod 126. The clamp 134 comprises a rotating sleeve 136 having a slot 138 for the saw blade 130 passing through, and a clamping element (not shown in the figure) that is received in the rotating sleeve 136 and clamps and releases the saw blade 130 along with the rotation of the rotating sleeve 136 with respect to the reciprocating rod axis 128. This kind of clamp is suitable for clamping the T-shaped saw blade, namely a saw blade with a protrusion at the tail, and the protrusion of the clamped saw blade is stopped by the end face of the rotating sleeve 136 with the slot 138. The outer wall of the rotating sleeve 136 extends outwards to form a clamping wrench 140, so an operator is able to turn the clamping wrench 140 to rotate around the reciprocating rod axis 128 so as to clamp and release the saw blade 130.

In this embodiment, the saw blade clamp assembly 14 also comprises the operating element 144 positioned on the upper surface 22 of the worktable 4. In other words, the outer surface of the worktable 4 in this embodiment refers to the upper surface 22 thereof. Of course, the position of the operating element 144 in the present invention is not only limited to the outer surface of the worktable, and the operating element is also capable of being disposed on the sidewall of the worktable, especially the front wall, which helps the operator replace the saw blade conveniently. The skilled persons in this field should understand that the operating element is also capable of being disposed on the outer surface of the supporting unit 10, for example, the front supporting wall or left/right supporting wall. In case the supporting unit has no supporting wall or only has the supporting leg, the outer surface of the supporting unit is the outer wall of the supporting leg. The distance between the operating element 144 and the blade clamp 134 is usually smaller than or equal to the length of a single arm of a person. Therefore, the operator is able to reach the operating element 144 comfortably and saves labor during the operation of replacing the saw blade.

The saw blade clamp assembly 14 comprises the clamping wrench 140 rotating around the reciprocating rod axis 128, and a linkage mechanism which is positioned between the operating element 144 and the clamping wrench 140 to force the perating element 144 to drive the clamping wrench 140 to rotate.

In this embodiment, the linkage mechanism comprises a connecting plate 152 that is connected with the operating element 144 and rotates around a rotation axis 155 parallel to the reciprocating rod axis 128, and an actuating element 158 that is connected with the connecting plate 152 and drives the clamping wrench 140 to move.

The operating element 144 comprises a sliding plate 146 that extends longitudinally, an opening 148 disposed in the middle portion of the sliding plate and a connecting rod 150 that extends vertically with respect to the sliding plate. The axis 151 of the connecting rod is parallel to the axis 149 of the opening and the two axes are disposed at an interval. In this embodiment, the sliding plate surface of the operating element 144 is basically aligned with the upper surface 22 of the worktable 4, and the tabletop of the worktable 4 has no protruding structure to influence the movement of the workpiece thereon. Of course, the operating element may also be sunk into the upper surface of the worktable, but can be directly touched from the upper surface. Therefore, the operating element 144 can be conveniently operated to replace the saw blade without influence on the movement of the workpiece. Meanwhile, the worktable has a sliding groove 32 for receiving the operating element 144, and correspondingly the surface of the groove composes the outer surface 22 of the worktable 4.

The connecting plate 152 comprises pin holes 154 disposed on two ends of the connecting plate 152. The operating element 144 is connected with the connecting plate 152 via the pin 156, one of the pin holes 154 and the connecting rod 150.

Preferably, the actuating element 158 comprises a rotating frame 158 positioned rotatably with the reciprocating rod 126. The rotating frame 158 comprises a C-shaped base portion 160 and a pushing column 162 which extends vertically with respect to the base portion 160. At one end of the base portion 160 is a connecting shaft portion 172 with a rotating shaft 174, and the pushing column 162 is positioned at the other end of the base portion 160. A connecting lug 168 is positioned between the two ends of the base portion 160 and provided with a hole 170 for connecting with the connecting plate 152 via a pin 178. Preferably, the rotating axis 155 of the connecting plate 152 is parallel to the rotating shaft 174 of the actuating element. Especially, the rotating axis 155 of the connecting plate 152 rotates around the rotating shaft 174 of the actuating element. The connecting shaft portion 172 of the rotating frame 158 is provided with a connecting hole 176, connecting with the gearbox housing 124 via the pin 179.

To ensure that the rotating frame 158 is able to actuate the clamping wrench 140 no matter where the reciprocating rod 126 is positioned, the height of the pushing column 162 is set to be more than the reciprocating travel of the reciprocating rod 126. Of course, the height of the pushing column 162 is better equal to the sum of the reciprocating travel of the reciprocating rod 126 and the axial length of the clamping wrench 140, so the pushing column 162 is capable of contacting the clamping wrench 140 on the whole length of the clamping wrench 140 and ensures to reliably push the clamping wrench 140 and rotate the rotating sleeve 136 of the clamp assembly.

The pushing column 162 has a biasing surface 164, and after the assembly of the saw blade clamp assembly 14 is completed, the biasing surface 164 is opposite to the biasing surface 142 of the clamping wrench 140. During the reciprocating cutting motion of the saw blade 130, the biasing surface 164 and the biasing surface 142 have no contact and keep a certain distance there-between. When the saw blade 130 is required to be replaced, the operating element 144 drives the connecting plate 152 to move so as to drive the rotating frame 158 to rotate around the rotating shaft 174. After the rotating frame 158 rotates to a certain angle, the biasing surface 164 contacts the biasing surface 142, and then the pushing column 162 is able to further push the clamping wrench 140 to rotate. To prevent the pushing column 162 from failing in the process of pushing the clamping wrench 140 to rotate, the pushing column 162 is provided with a stop protrusion 166, so when the clamping wrench 140 is pressed against the pushing column 162, the stop protrusion 166 prevents the biasing surface 142 of the clamping wrench 140 from leaving the biasing surface 164 of the pushing column 162.

The saw blade clamp 14 also comprises an elastic element 180 forcing the operating element 144 to move towards the clamping position. In this embodiment, the cutting mechanism 12 comprises the gearbox housing 124. The elastic element 180 is a torsion spring 180 disposed between the actuating element 158 and the gearbox housing 124, forcing the actuating element 158 to rotate towards the position where the saw blade 130 is clamped. Specifically, the position of the gearbox housing 124, close to the receiving hole 125 for the reciprocating rod 126, is provided with a groove 182 which extends along the reciprocating rod axis 128 and a stopping groove 184 which is protruded from the groove. The groove 182, the stopping groove 184 and the connecting hole 176 of the connecting shaft portion 172 together receive the torsion spring 180. Therefore, one end of the torsion spring 180 is clamped in the stopping groove 184, while the other end is clamped in the connecting hole 176.

In this embodiment, the operating element 144 moves relative to the worktable 4. The worktable 4 has the sliding groove 32, and the operating element 144 comprises the sliding plate 146. The sliding plate 146 is operable to slide between the position where the saw blade is clamped and the position where the saw blade is released along the sliding groove 32. The sliding groove 32 is positioned at the front portion of the worktable 4 and on the right side of the opening 20, so the operator is able to replace the saw blade at a comfortable position. The operating element 144 also comprises the opening 148 formed on the sliding plate 146. Therefore, the operator is able to stretch their fingers into the opening 148 to move the sliding plate 146 in the direction away from the saw blade 130.

Figure 4:
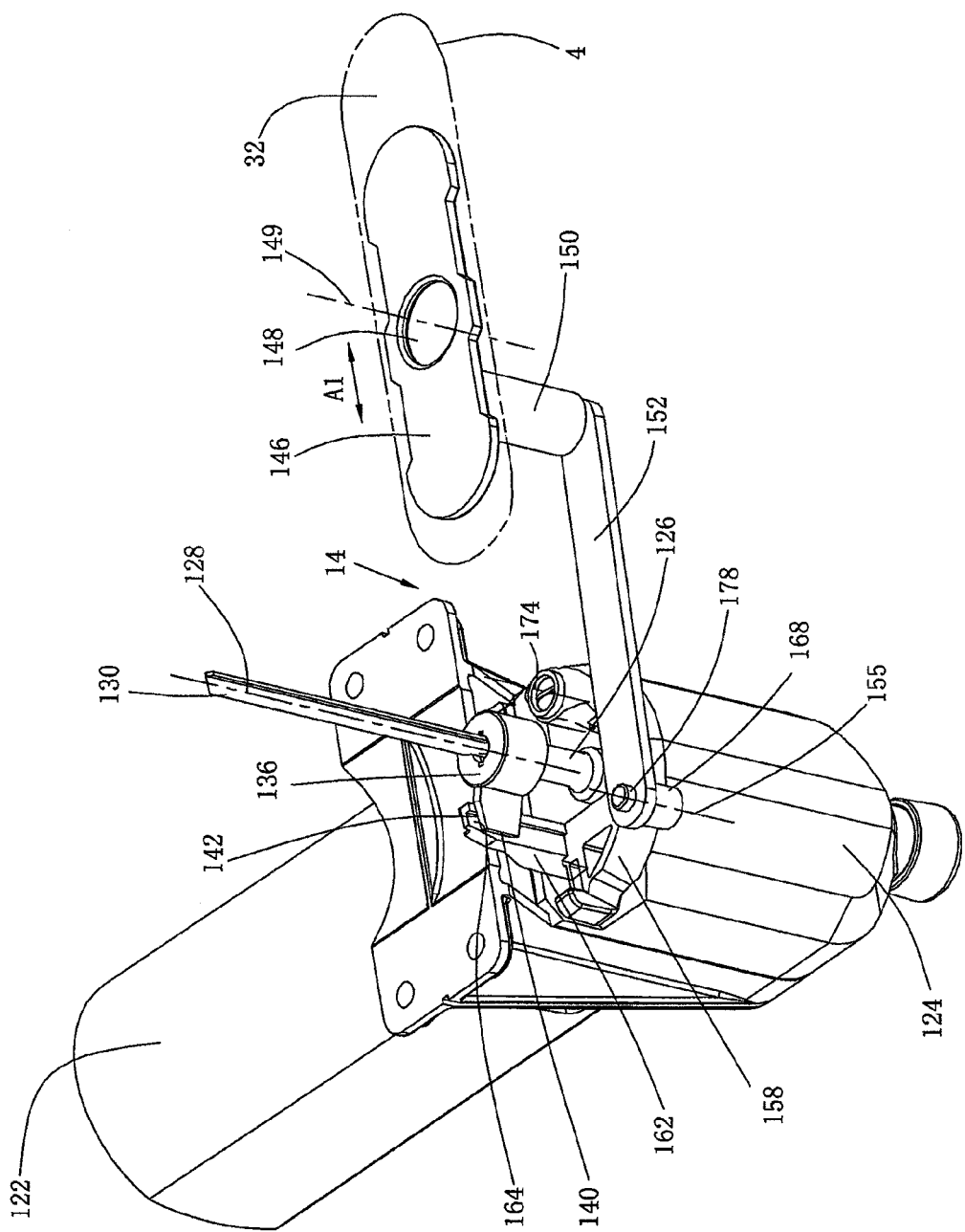
FIG. 4 is a schematic view of the saw blade clamp assembly of the cutting machine in FIG. 3, wherein the saw blade clamp assembly is clamped.
Figure 5:
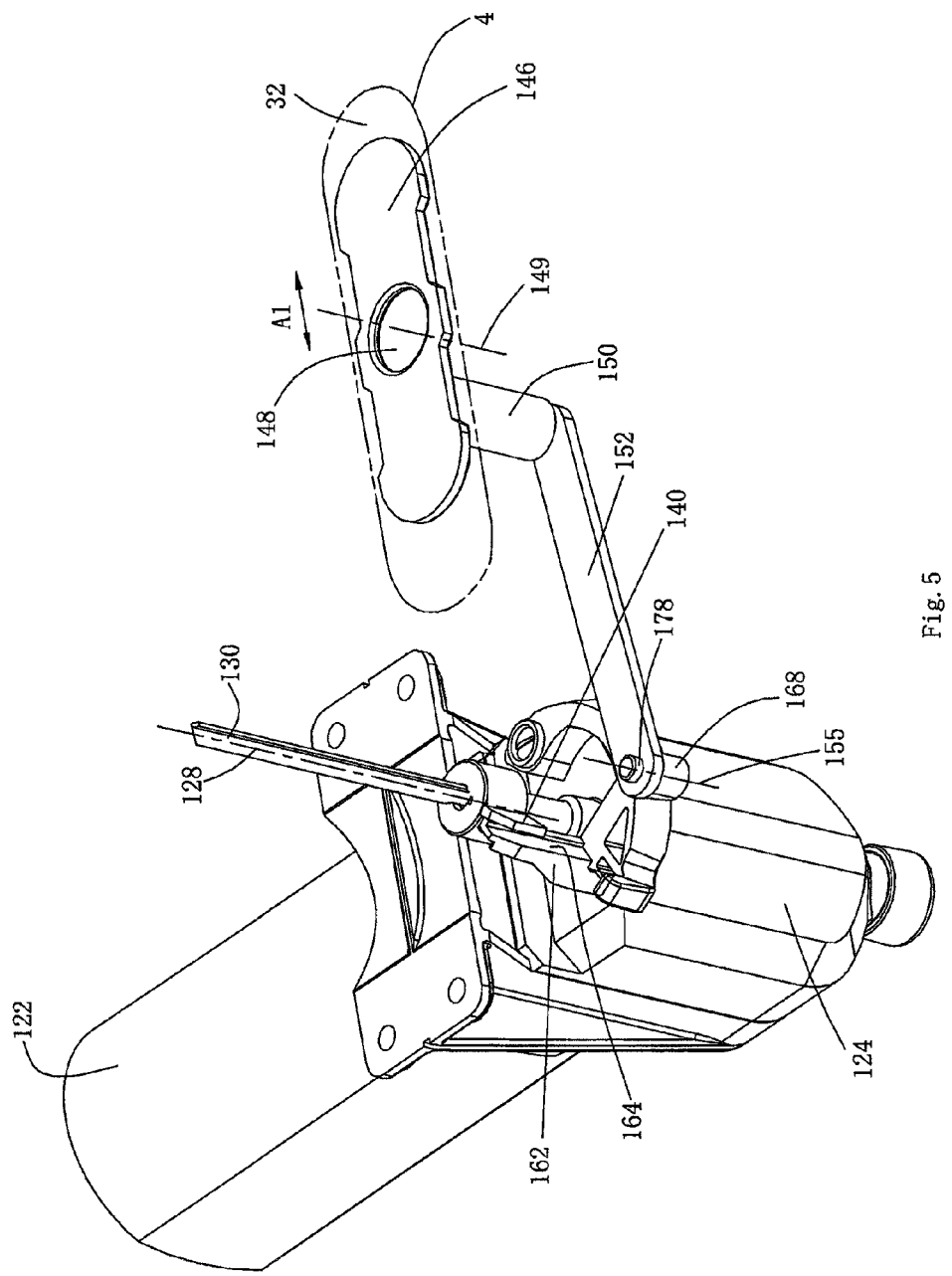
FIG. 5 is a schematic view of the saw blade clamp assembly of the cutting machine in FIG. 3, wherein the saw blade clamp assembly is released.
Figure 9:
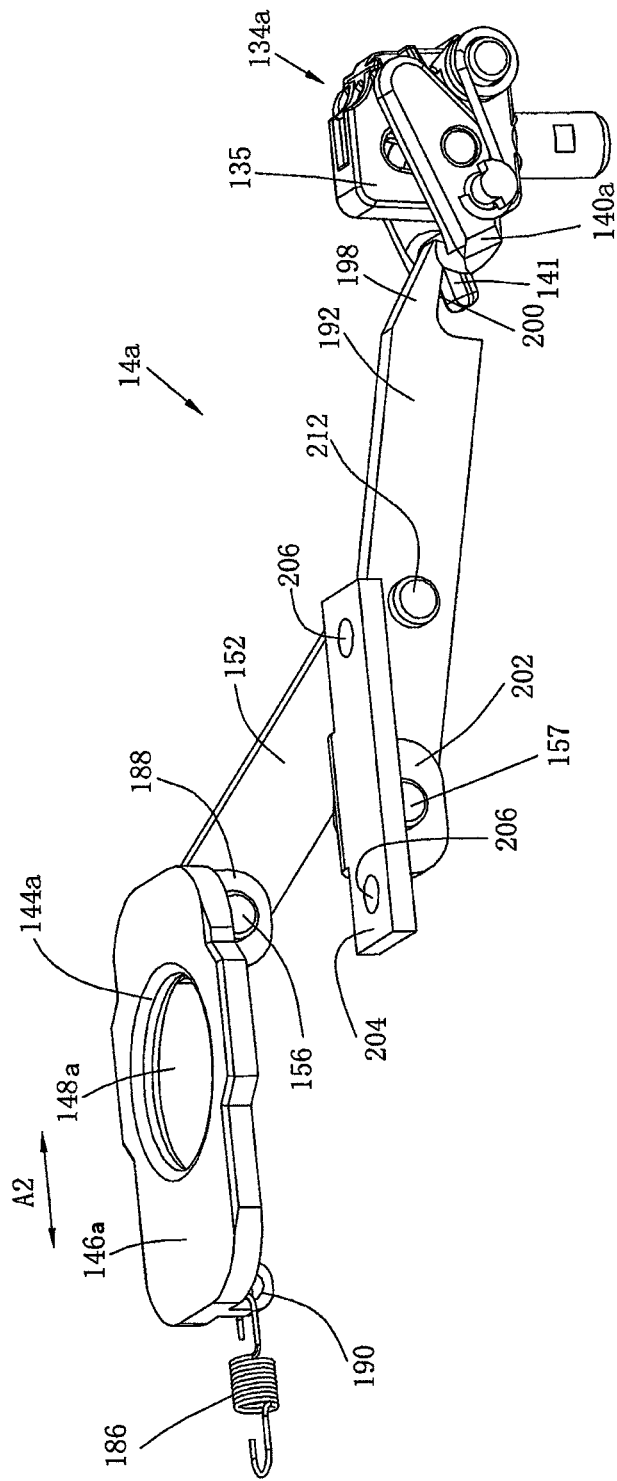
FIG. 9 is a schematic view of the saw blade clamp in FIG. 8, wherein the saw blade clamp assembly is released.

The attached drawings 4-7 below illustrate the concrete operation process of the saw blade clamp assembly 14. FIG. 4 and FIG. 6 are schematic views of the saw blade clamp assembly 14 in the clamped state. In the clamped state, the operating element 144 is located at the clamping position on the far left end of the sliding groove 32. Under the action of the torsion spring 180, the rotating flame 158 separates the biasing surface 164 of the pushing column 162 from the biasing surface 142 of the clamping wrench 140. At this time, the horizontal distance from the opening axis 149 of the operating element 144 to the reciprocating rod axis 128 is L1, the protrusion of the saw blade 130 is stopped by the end face of the rotating sleeve 136 of the clamp, and the saw blade is clamped by the clamping element. When the saw blade is required to be replaced, the operator moves the sliding plate 146 rightwards along the direction of the arrow Al in the figure to force the connecting plate 152 to move so as to drive the rotating frame 158 to rotate around the rotating shaft 174, and then the biasing surface 164 of the pushing column 162 is forced to contact the biasing surface 142 of the clamping wrench 140; if it continuously moves the sliding plate 146, the pushing column 160 pushes the clamping wrench 140 to the release position, the protrusion of the saw blade 130 is aligned with the slot 138 on the rotating sleeve 136 of the clamp 134, and then the operator is able to take out the saw blade with the other hand. FIG. 5 and FIG. 7 are schematic views of the saw blade clamp assembly 14 at the released state. At the released state, the operating element 144 is located at the releasing position on the far right end of the sliding groove 32. The horizontal distance from the opening axis 149 of the operating element 144 to the reciprocating rod axis 128 is L2 which is more than L1. At this moment, if the operator releases the sliding plate 146, the rotating frame 158 will automatically return to the clamped state under the action of the torsion spring 180 and correspondingly drive the connecting plate 152 and the operating element 144 to return to the clamping positions.

The second embodiment of the saw blade clamp 14a is further described below in combination with the attached drawings 8-11.

In this embodiment, the saw blade clamp assembly 14a comprises a clamp 134a connected to the reciprocating rod 126. The clamp 134a comprises a U-shaped clamping wrench 140a and a clamping element (not shown in the figure) which is operated by the clamping wrench 140a and moves along the inclined sliding groove on the clamping body 135 to clamp and release the saw blade 130. This kind of clamp is suitable for clamping T-shaped and U-shaped saw blades, which means no matter whether or not the tail of the saw blade has a protrusion the saw blade is capable of being clamped. The operator is able to pull the clamping wrench 140a to rotate with respect to the axis vertical to the reciprocating rod axis 128, so the clamping element is forced to clamp and release the saw blade 130.

In this embodiment, the operating element 144a is also disposed on the upper surface 22 of the worktable 4.

The saw blade clamp assembly 14a comprises the clamping wrench 140a rotating around the axis vertical to the reciprocating rod axis 128, and a linkage mechanism is disposed between the operating element 144a and the clamping wrench 140a, so the operating element 144a is forced to drive the clamping wrench 140a to rotate so as to clamp and release the saw blade.

In this embodiment, the linkage mechanism comprises a connecting plate 152 that is connected with the operating element 144a and rotates around a rotation axis vertical to the reciprocating rod axis 128, and an actuating element 192 that is connected with the connecting plate 152 and drives the clamping wrench 140a to move.

The operating element 144a comprises a sliding plate 146a that extends longitudinally, an opening 148a disposed in the middle portion of the sliding plate, and large lugs 188 and a small lug 190 which are positioned on the two ends of the sliding plate 146a and extend vertically with respect to the sliding plate 146a. There are two large lugs 188, one end of the connecting plate 152 is capable of being inserted between the two large lugs 188 which are provided with holes matched with one of the pin holes 154 on the connecting plate 152, and operating element 144a and the connecting plate 152 are connected via the pin 156. The hole axes 189 on the large lugs 188 are orthogonal to the opening axis 149.

Preferably, the actuating element 192 comprises a pressing pole 192 rotating with respect to the axis vertical to the reciprocating rod axis 128. A pivot hole 194 is disposed at one end of the pressing pole 192, a pressing portion 198 is disposed on the other end, and a pin hole 196 is disposed between the two ends. The pivot hole 194 of the pressing pole 192 and a pin hole 210 of a fixing plate 202 are rotationally mounted on the worktable 4 via the pin 157. The fixing plate 202 has a fixing portion 204 and a connecting portion 208 which extends vertically with respect to the fixing portion. The fixing portion 204 is provided with two mounting holes 206 for stably connecting the fixing plate 202 and the worktable 4 or the supporting unit 10. The pin hole 154 on the connecting plate 152 and the pin hole 196 in the middle portion of the pressing pole 192 are connected by the pin 212. The pressing portion 198 of the pressing pole 192 has a pressing surface 200 which is driven by the connecting plate 152 to rotate around the rotating pin 157 so as to move the clamping wrench 140a.

Figure 10:
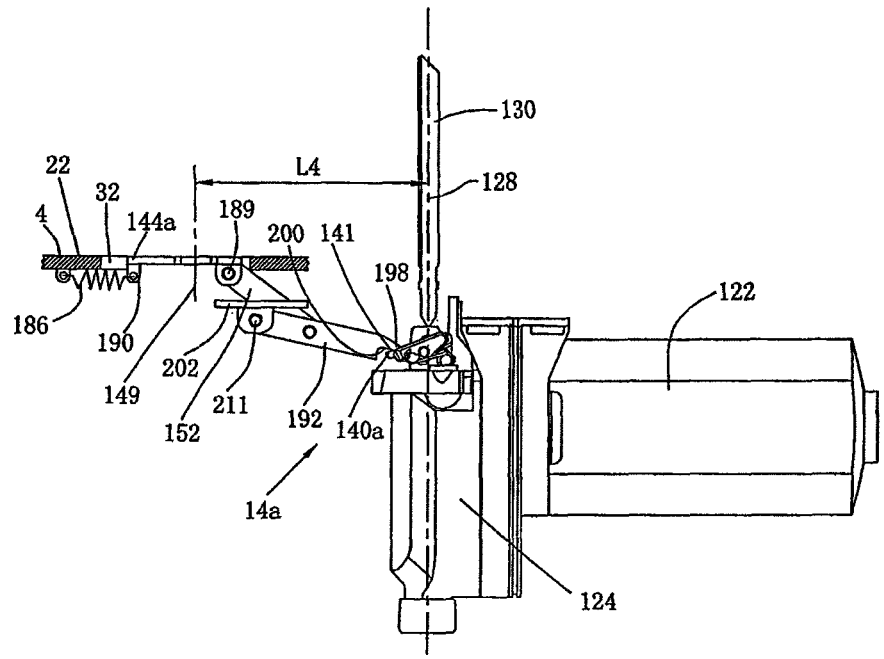
FIG. 10 is a side view of the saw blade clamp assembly in FIG. 9.
Figure 11:
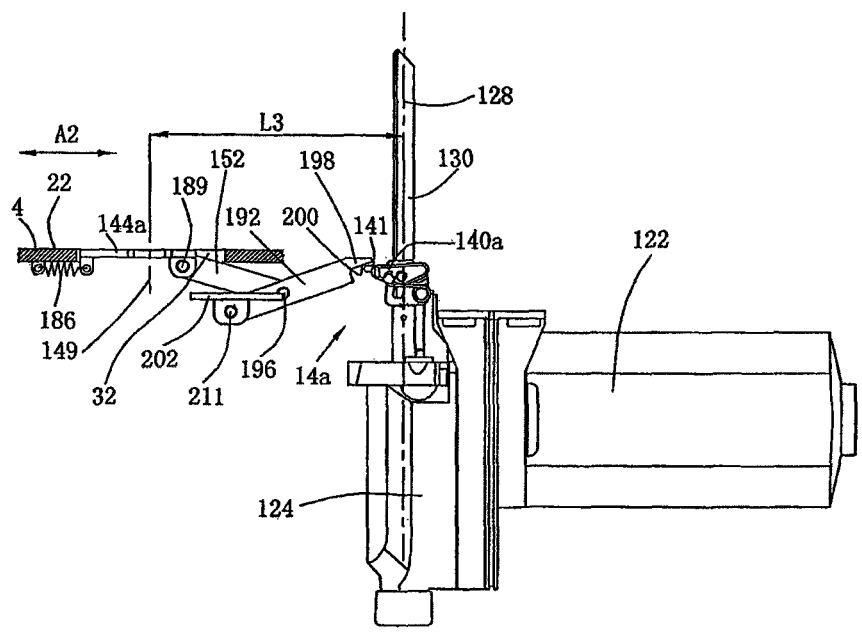
FIG. 11 is a side view of the saw blade clamp assembly in FIG. 8, wherein the saw blade clamp assembly is clamped.
Figure 12:
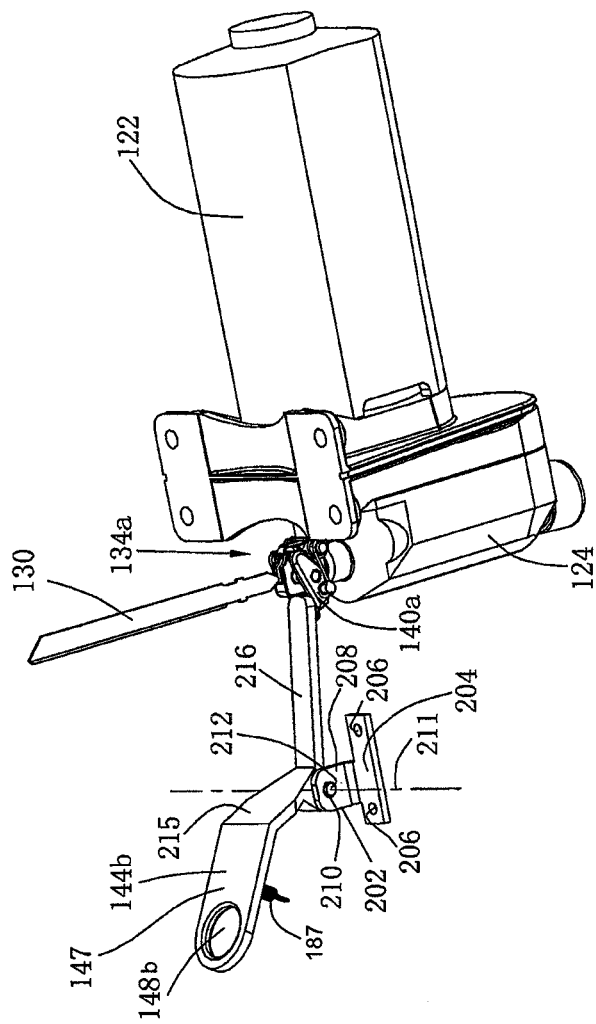
FIG. 12 is a schematic view of the saw blade clamp assembly of the cutting machine of the third embodiment according to the present invention.

The pressing pole 192 is able to move between the releasing position as shown in FIG. 10 and the clamping position as shown in FIG. 11, and the rotating angle is θ. The reciprocating rod 126 is at different reciprocating positions in different cutting processes. The reciprocating travel of the reciprocating rod 126 is H. The distance from the pivot hole 194 of the pressing pole 192 to the pressing surface 200 of the pressing portion 198 is D. To ensure that the pressing pole 192 is able to actuate the clamping wrench 140a no matter where the reciprocating rod 126 is positioned, the product uses the distance from the pivot hole 194 of the pressing pole 192 to the pressing surface 200 of the pressing portion 198 by multiplying the sine of the angle about the pressing pole 192 rotating around the pivot hole 194 which is larger than the reciprocating travel of the reciprocating rod 126, which means $D*\sin θ>H$. Of course, the product uses the distance from the pivot hole 194 of the pressing pole 192 to the pressing surface 200 of the pressing portion 198 multiplies the sine of the angle about the pressing pole 192 rotating around the pivot hole 194 is which larger than the sum of the reciprocating travel of the reciprocating rod 126 and the width of the pressing surface of the clamping wrench 140a, so the pressing pole 192 is able to contact the clamping wrench 140a on the whole pressing surface width of the clamping wrench to ensure that the clamping wrench 140a is reliably clamped.

The pressing pole 192 has a pressing surface 200, and after the assembly of the saw blade clamp assembly 14a is completed, the pressing surface 200 faces the pressing surface 141 of the clamping wrench 140a. During the reciprocating cutting motion of the saw blade 130, the pressing surfaces 200 and 141 have no contact and keep a certain distance between them. When the saw blade 130 is required to be replaced, the operating element 144a drives the connecting plate 152 to move so as to drive the pressing pole 192 to rotate around the rotating axis 211. After the pressing pole 192 rotates to a certain angle, the pressing surfaces 200 and 141 have contact, and then the pressing pole 192 is able to further force the clamping wrench 140a to rotate.

The saw blade clamp assembly 14a also comprises an elastic element 186 forcing the operating element 144a to move towards the clamping position. In this embodiment, the elastic element is a tension spring 186 disposed between the operating element 144a and the worktable 4, forcing the operating element 144a to move towards the position where the saw blade is clamped. Specifically, the operating element 144a is provided with the small lug 190 with a hole. One end of the tension spring 186 is hooked into the hole of the small lug 190, and the other end is hooked to the worktable 4.

In this embodiment, the operating element 144a translates relative to the worktable 4. The worktable 4 is provided with the sliding groove 32, and the operating element 144 comprises the sliding plate 146a. The sliding plate 146a is able to slide between the position where the saw blade is clamped and the position where the saw blade is released along the sliding groove 32. The sliding groove 32 is positioned at the front portion of the worktable 4 and on the right side of the opening 20, so the operator is able to replace the saw blade at a comfortable position. The operating element 144a also comprises an opening 148a formed on the sliding plate 146a. Therefore, the operator is able to stretch their fingers into the opening 148a to move the sliding plate 146a in the direction away from the saw blade 130.

The attached drawings 10-11 below illustrate the concrete operation process of the saw blade clamp assembly 14a. FIG.

11 is a schematic view of the saw blade clamp assembly 14a at the clamped state. At the clamped state, the operating element 144a is located at the clamped position on the far left end of the sliding groove 32. Under the action of the tension spring 186, the pressing surface 200 of the pressing pole 192 and the pressing surface 141 of the clamping wrench 140a are separated. At this moment, the vertical distance from the opening axis 149 of the operating element 144a to the reciprocating rod axis 128 is L3, and the saw blade is clamped by the clamping element. When the saw blade is required to be replaced, the operator should move the sliding plate 146a rightwards along the direction of the arrow A2 in the figure to force the connecting plate 152 to move so as to drive the pressing pole 192 to rotate around the rotating axis 211, and then the pressing surface 200 of the pressing pole 192 is forced to contact the pressing surface 141 of the clamping wrench 140a; if it continuously moves the sliding plate 146a, the pressing pole 192 pushes the clamping wrench 140a to the release position, and then the operator is able to take out the saw blade with the other hand. FIG. 10 is a schematic view of the saw blade clamp assembly 14a at the released state. At the released state, the operating element 144a is located at the releasing position on the far right end of the sliding groove 32. The vertical distance from the opening axis 149 of the operating element 144a to the reciprocating rod axis 128 is L4 which is shorter than L3. At this moment, the operator releases the sliding plate 146a, the operating element 144a will automatically return to the clamped state under the action of the tension spring 186 and correspondingly drive the connecting plate 152 and the pressing pole 192 to return to the clamping positions. Therefore, the clamping wrench 140a of the clamp 134a will also return to the clamping position.

The attached drawings 12-14 illustrate the third embodiment of the saw blade clamp assembly 14b.

In this embodiment, the units and parts of the saw blade clamp assembly 14b, identical with those in the second embodiment, adopt the same mark numbers. Herein, the following is the detailed description of the differences between this embodiment and the above embodiment.

In this embodiment, the operating element 144b is positioned on the upper surface of the worktable 4. The operating element 144b rotates with respect to the worktable 4 to clamp and release the saw blade.

The saw blade clamp assembly 14b comprises the clamping wrench 140a rotating around the axis vertical to the reciprocating rod axis 128, and an actuating element 216 is disposed between the operating element 144b and the clamping wrench 140a.

The worktable 4 is provided with the receiving groove 33 in which the operating element 144b is received. The operating element 144b comprises a flat plate body 147 and an opening 148b formed at one end of the flat plate body 147. The middle portion of the flat plate body 147 extends vertically to form a pull ring 214. In this embodiment, the actuating element 216 is a pressing plate 216. One end of the pressing plate 216 faces the clamping wrench 140a, while the other end is stably connected with the end of the operating element 144b via the rotating connection portion 215. Preferably, the operating element 144b, the rotating connection portion 215 and the pressing plate 216 are integrally molded. The skilled persons in this field should understand that the pressing plate 216 and the operating element 144b can have other fixed connections, such as welding, riveting, etc. The rotating connection portion 215 has a pivot hole connected to a fixing plate 202 via a pin 212. Therefore, the operating element 144b and the pressing plate 216 rotates around the same rotating axis 211.

Figure 13:
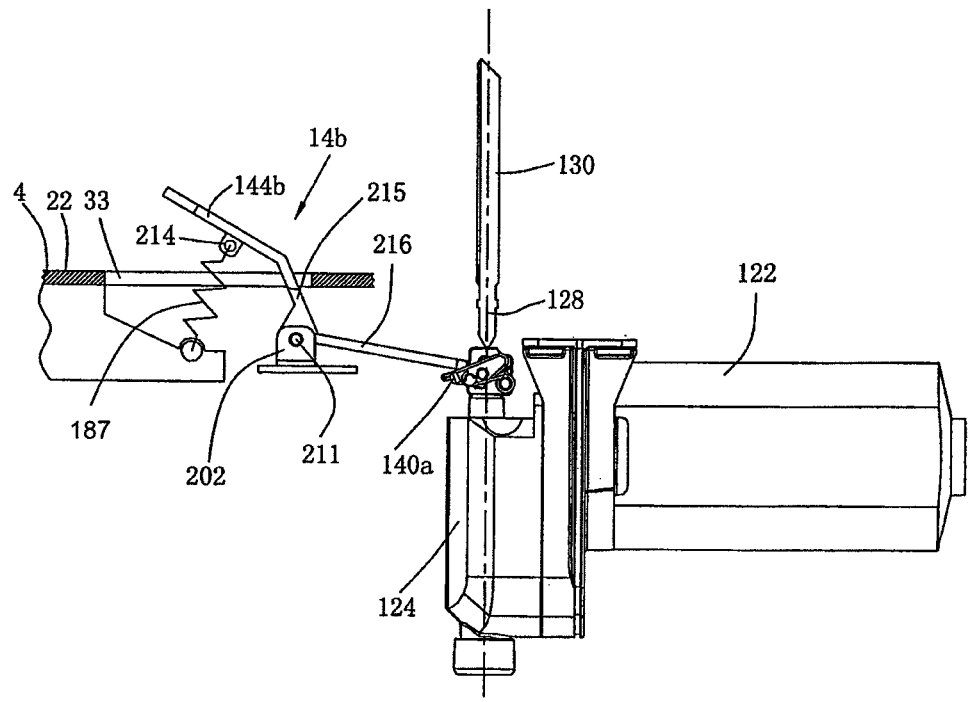
FIG. 13 is a side view of the saw blade clamp assembly in FIG. 12, wherein the saw blade clamp assembly is released.
Figure 14:
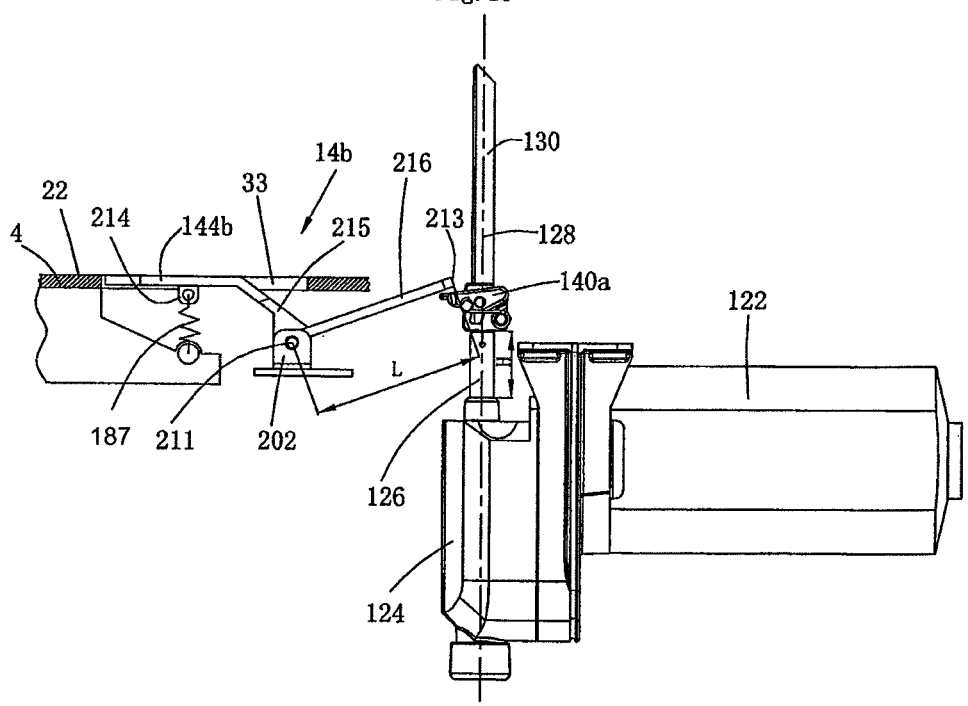
FIG. 14 is a side view of the saw blade clamp assembly in FIG. 12, wherein the saw blade clamp assembly is clamped.
Figure 15:
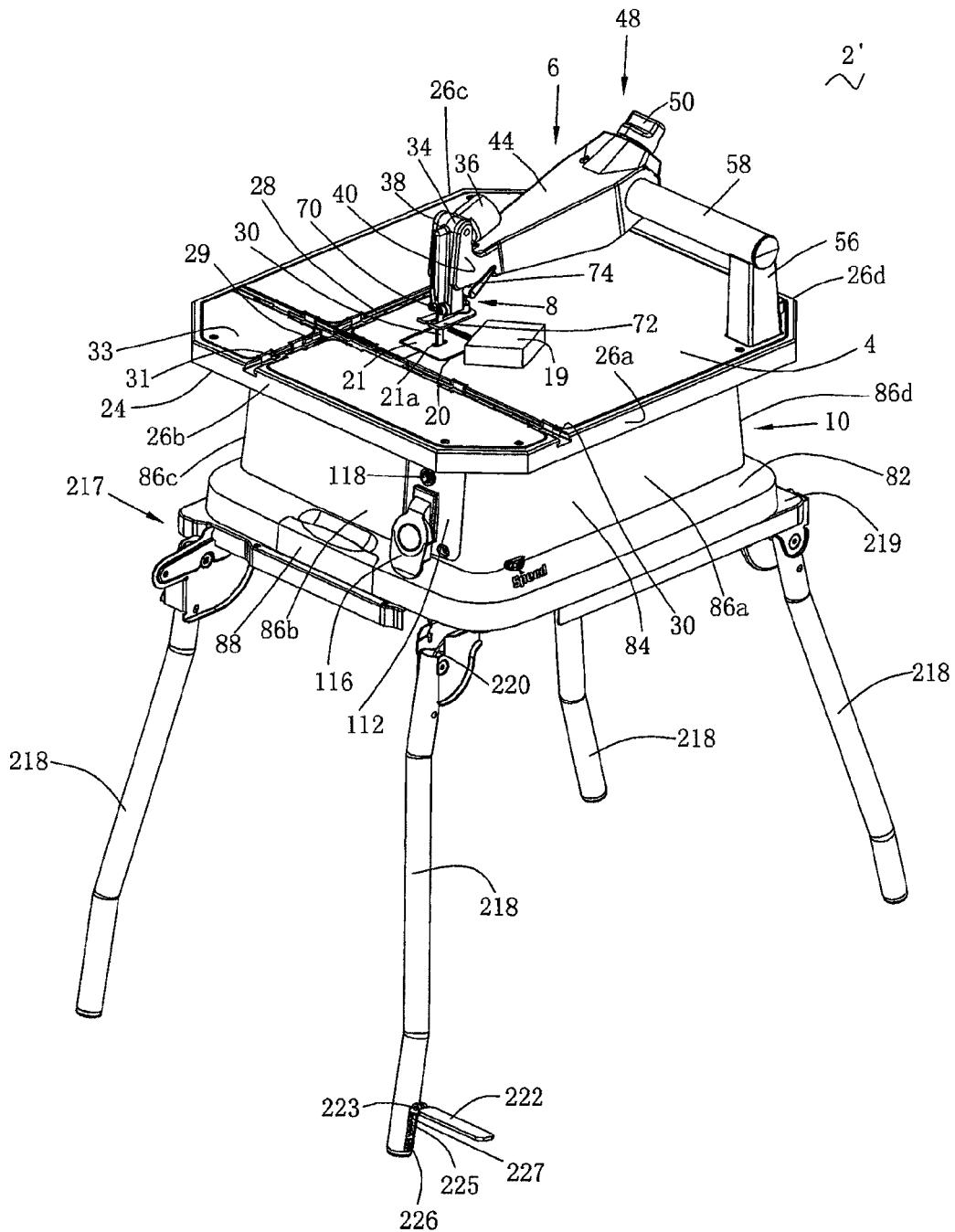
FIG. 15 is a schematic view of the cutting machine of the fourth embodiment according to the present invention.
Figure 16:
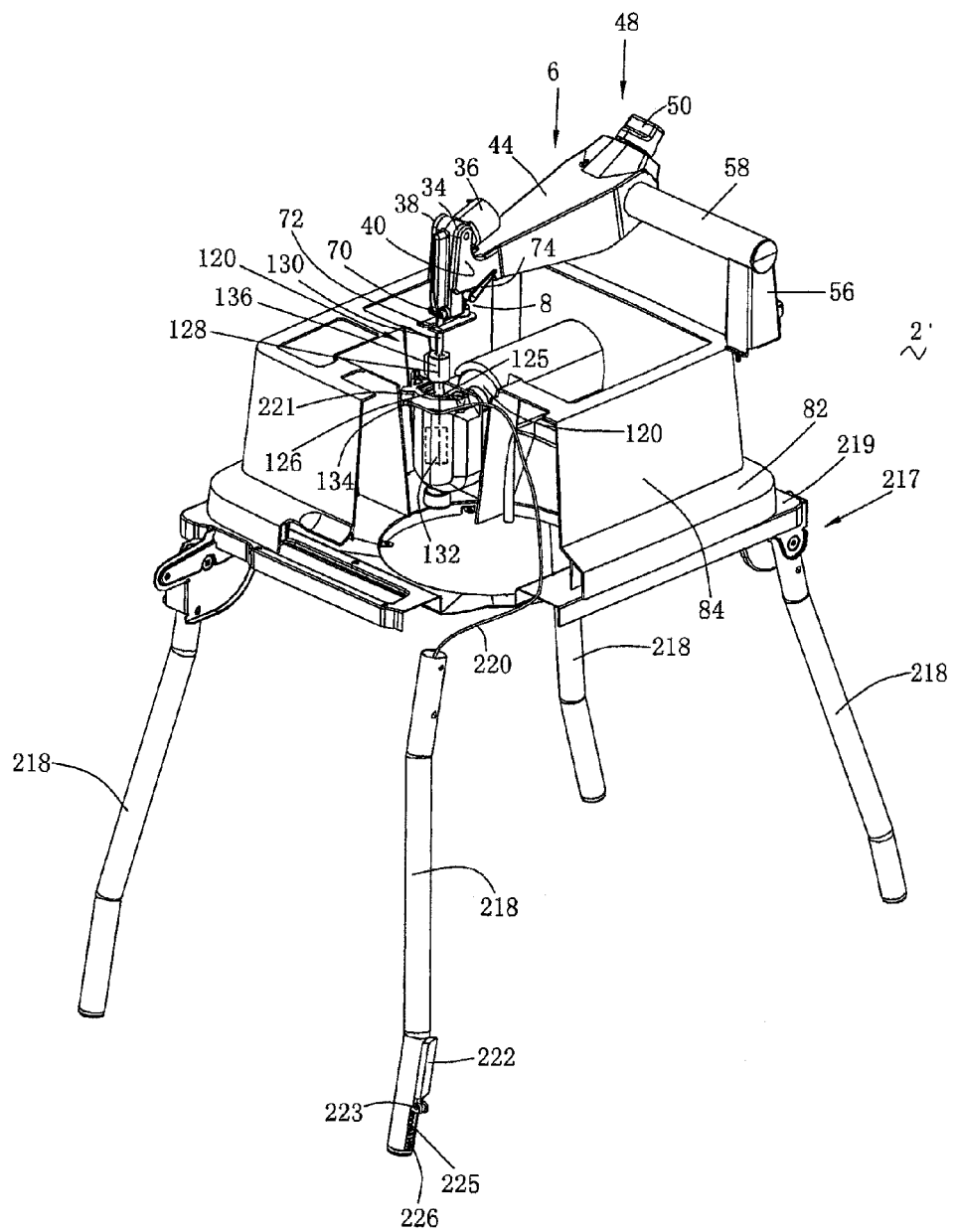
FIG. 16 is a schematic view of the cutting machine in FIG. 15, wherein the worktable, part of the supporting unit and part of the supporting frame is removed so that the saw blade clamp assembly is visible.

The pressing plate 216 is able to rotate between the releasing position as shown in FIG. 13 and the clamping position as shown in FIG. 14, and the rotating angle is a. The reciprocating rod 126 is at different reciprocating positions in different cutting processes. The reciprocating travel of the reciprocating rod 126 is H. The distance from the pivot hole of the pressing plate 216 to the pressing surface 213 is L. To ensure that the pressing plate 216 is able to actuate the clamping wrench 140a no matter where the reciprocating rod 126 is positioned, the product uses the distance from the pivot hole of the pressing plate 216 to the pressing surface and multiplies the sine of the angle about the pressing plate 216 rotating around the rotating axis 211 which is larger than the reciprocating travel of the reciprocating rod 126, which means that $L*\sin \alpha > H$. Of course, the product uses the distance from the pivot hole of the pressing plate 216 to the pressing surface 213 and multiplies the sine of the angle about the pressing plate 216 rotating around the rotating axis 211 which is larger than the sum of the reciprocating travel of the reciprocating rod 126 and the width of the pressing surface 213 of the clamping wrench 140a, so the pressing plate 216 is able to contact the clamping wrench 140a on the whole pressing surface 213 width of the clamping wrench to ensure that the clamping wrench 140a is reliably clamped.

One end of an elastic element, namely a tension spring 186, is hooked with the pull ring 214 of the operating element 144b, and the other end is connected with the worktable 4 or the supporting unit 10, so the operating element 144b moves towards the clamping position.

The operating element 144b is also capable of being disposed on the supporting unit. Specifically, the operating element is disposed on the base at the bottom portion of the supporting unit. Furthermore, the operating element is disposed at the front of the base, namely the side that the operator directly faces during operation.

The skilled persons in this field should understand that the concrete structures of the operating element, etc. in the present invention may have variations. For example, clamps have many structures in the prior art, capable of being equivalently replaced by the clamp structure disclosed in the present invention. For example, the elastic element has two forms, namely the torsion spring and the tension spring, in the present invention, but the skilled persons in this field should know that other kinds of springs, such as the compression spring and the leaf spring, or other kinds of elastic elements, such as the elastic rubber piece, etc., all can be used as the elastic element in the present invention. Therefore, any variation and replacement based on the present invention shall be within the protection scope of the present invention.

The fourth embodiment of the saw blade clamp assembly 229 is further described in combination with the attached drawings 15-17 below.

In this embodiment, the units and parts of the cutting machine 2, identical with those in the first embodiment, adopt the same mark numbers. Herein, the following is the detailed description of the differences between this embodiment and the above embodiment.

Figure 17:
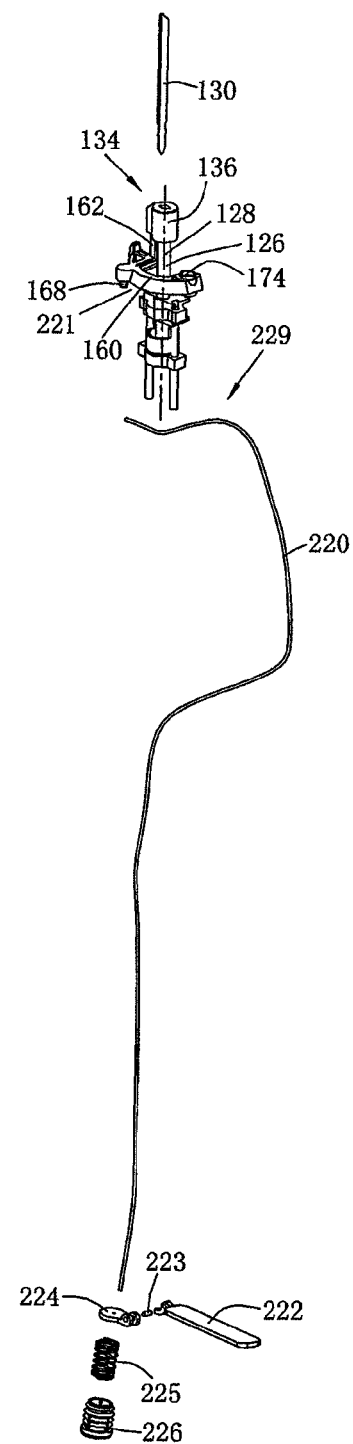
FIG. 17 is a partly exploded view of the saw blade clamp assembly of the cutting machine in FIG. 16.
Figure 18:
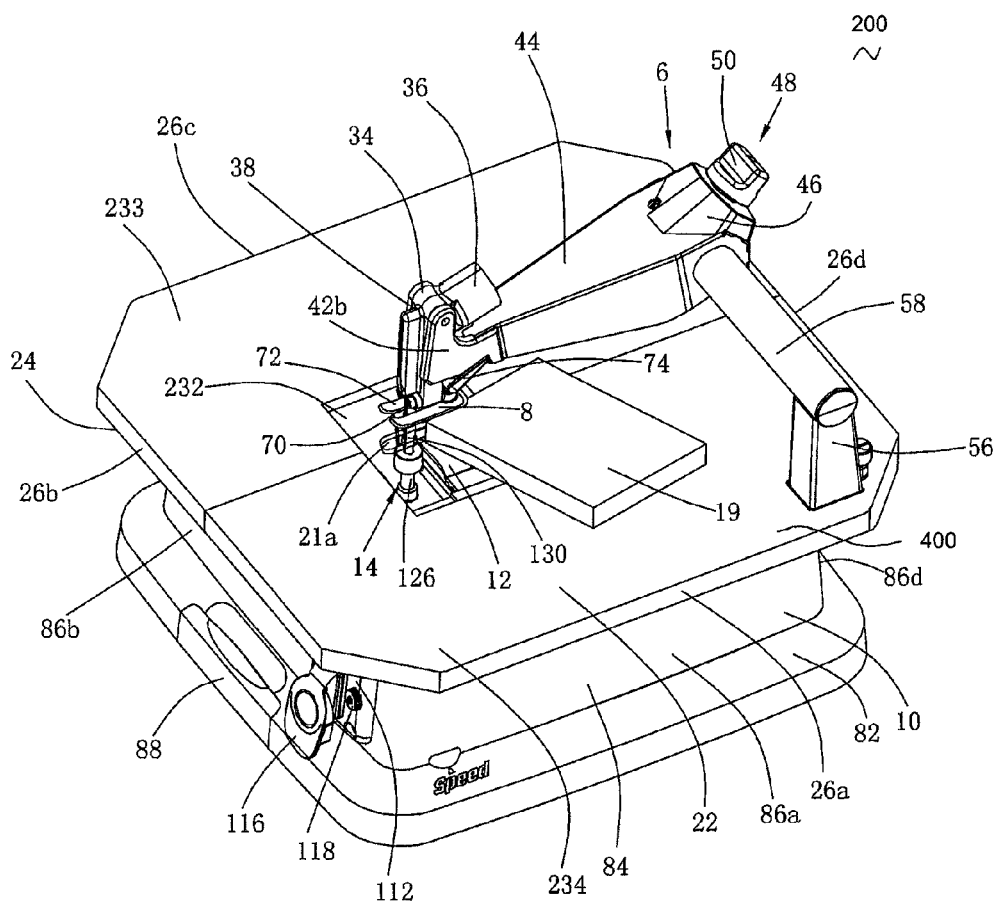
FIG. 18 is a schematic view of the cutting machine of the fifth embodiment according to the present invention.

The cutting mechanism 12 has the saw blade clamp assembly 229 operable to clamp and release the saw blade 130. As shown in FIG. 17, the saw blade clamp assembly 229 comprises the clamp 134 for fixing the saw blade, a corner bracket 221 rotating with respect to the reciprocating rod 126 and a flexible connecting element 220 connected to the corner bracket 221. The flexible connecting element 220 is operable to drive the clamp 134 to move between the clamping position and the releasing position. The skilled persons in this field should understand that the clamp 134 disclosed in the present invention is only one of variously structured clamps, and clamps with other structures, for example clamps which are pulled by the wrench to clamp a steel column and move along the inclined sliding groove to clamp and release the saw blade, are also suitable for the present invention with some detailed modifications. The clamp 134 in the present invention adopts the clamp structure of the rotating sleeve 136 rotating with respect to the reciprocating rod axis 128. The rotating sleeve 136 has an opening capable of receiving the saw blade 130 and forces the protrusion of the saw blade 130 to press against the inner end face of the rotating sleeve 136 to prevent the saw blade 130 from falling after the saw blade 130 is inserted into the opening and rotates to a certain angle.

In this embodiment, the flexible connecting element 220 is a steel wire. The steel wire has certain rigidity and toughness and ensures that the operating device of the saw blade clamp assembly is positioned at a position where the operator can easily reach. The skilled persons in this field know that except for the steel wire, the flexible connecting element may also be other metal wires, high-strength plastic ropes, rubber belts, etc. Such flexible elements are capable of being bent, have a high elastic modulus, and are difficult to break. The tension of the flexible connecting element 220 is also capable of being adjusted by a tensioning mechanism (not shown in the figure). Usually, the flexible connecting element 220 is capable of being supported and actuated only by a certain supporting surface. To adjust and control the tension of the flexible connecting element 220, a roller (not shown) is disposed on the supporting unit or the bracket which supports the flexible connecting element 220, one part of the flexible connecting element contacts an annular groove of the roller, and the supporting point of the roller is capable of being relatively adjusted, so the tension of the flexible connecting element is adjusted.

In this embodiment, a foot pressing plate connected with the steel wire 220 is arranged below the worktable 4, so the operator is able to control the saw blade clamp assembly 229 by pedaling to avoid stooping. In this embodiment, the clamp 134 comprises the rotating sleeve 136 capable of rotating around the reciprocating rod axis 128, and the flexible connecting element, namely the steel wire 220, converts the rotation of the rotating sleeve 136 into the linear motion of the foot pressing plate. The foot pressing plate performs linear motion, so the operator may easily apply force and the actions of clamping and releasing the saw blade are simple.

To ensure that the flexible connecting element 220 is able to drive the rotating sleeve of the clamp 134 to move, the corner bracket 221 rotating with respect to the reciprocating rod axis 128 is disposed between the flexible connecting element 220 and the clamp 134, one end of the flexible connecting element 220 is connected with the corner bracket 221 and the other end thereof is connected with the foot pressing plate. Due to the corner bracket, the motion of the rotating sleeve 136 is more easily converted into the movement of the foot pressing plate and more easily ensures that the clamp 134 is configured into the released or clamped state. In this embodiment, the corner bracket 221 comprises a C-shaped base portion 160, one end of the base portion is connected with the rotating shaft 174, the other end of the base portion 160 is provided with the pushing column 162 which extends vertically, the connecting lug 168 is disposed between the two ends of the base portion 160, and the steel wire 220 is penetrated into the connecting lug 168. The pushing column 162 pushes the rotating sleeve 136 of the clamp, and the whole corner bracket 221 rotates around the rotating shaft 174, to ensure that the steel wire 220 is able to pull the corner bracket 221 to rotate.

A cutting machine 2' also comprises a supporting frame 217 with supporting surface 219 and at least three supporting legs 218. In this embodiment, there are four supporting legs 218, and according to the actual demands, the quantity of the supporting legs 218 is capable of being adjusted. The cutting machine 2' is supported on the supporting flame 217, so the foot pressing plate is disposed at the lower side of one of the supporting legs 218 so as to operate the foot pressing plate conveniently. This supporting leg 218 is positioned on the right front side below the worktable 4. Of course, this supporting leg 218 is also capable of being positioned on the left front side below the worktable 4 according to the habit of the operator. The foot pressing plate is able to move axially with respect to the supporting leg 218. The supporting unit 10 of the cutting machine 2' is positioned on the supporting surface 219 of the supporting flame 217, the supporting legs 218 support the supporting unit 10, so the saw blade 130 is positioned at a position where the operator works comfortably and controls the saw blade clamp assembly with feet conveniently. The lower end of the supporting leg 218 with the foot pressing plate is provided with a guiding groove 227. A moving block 224 and a footplate 222 move along the extension direction of the guiding groove 227.

In this embodiment, the steel wire 220 penetrates through the supporting surface 219 and is at least partly received into the supporting leg 218. Therefore, the whole cutting machine has no flexible connecting element outside and is compactly structured and the steel wire is difficult to break or deform in case of misoperation.

The foot pressing plate comprises the footplate 222 and the moving block 224 which is received in the supporting leg 218. The footplate 222 is connected with the moving block 224 via a rotating shaft 223 and therefore is able to rotate with respect to the moving block 224. When the saw blade replacement is completed and the saw blade is not required to be clamped or released, the footplate 222 is able to rotate with respect to the moving block 224 to the position where the footplate 222 is adhered to the outer wall of the supporting leg 218. At this moment, the footplate 222 is inoperable so as to avoid the event that the operator carelessly steps on the footplate and releases the saw blade.

An elastic element 225 received in the supporting leg 218 is positioned between the footplate 222 and the moving block 224, pressing the moving block 224 to move towards the position wherein the steel wire 220 is unloosened. Therefore, the saw blade clamp assembly 229 is kept at the clamped position at the normal state. Meanwhile, the end portion of the supporting leg 218 is provided with an end cover 226, one end of the spring is pressed against the end face of the moving block 224, and the other end thereof is pressed against the inner end face of the end cover 226. The end cover 226 and the supporting leg 218 are connected via screw threads. In this embodiment, the elastic element 225 is a compression spring. The skilled persons in this field know that the elastic element 225 may have other forms, such as leaf spring, tension spring, etc., which is not descried in detailed herein. Therefore, any variation and replacement based on the present invention shall be within the protection scope of the present invention.

The attached drawings 18-20 illustrate a cutting machine 200 in the fifth embodiment.

In this embodiment, the units and parts of the cutting machine 200, identical with those in the first embodiment, adopt the same mark numbers. Herein, the following is the detailed description of the differences between this embodiment and the above embodiment.

A worktable 400 has a transparent portion 232, and the saw blade clamp assembly 14 is positioned below the transparent portion 232. During operation, the operator is able to observe the concrete situation of the saw blade clamp assembly 14 from the transparent portion 232. The transparent portion 232 is basically square, aligned with the upper surface 22 of the worktable 400. In a view of manufacturing, the position, where the cutting machine is mounted, of the middle portion of the worktable 400 has an opening, and the transparent portion 232 is embedded into the opening, so the upper surface of the transparent portion 232 and the upper surface 22 of the worktable 400 are aligned and together support the workpiece. The transparent portion 232 is attached to the worktable 4 to become one part of the worktable 400.

In this embodiment, the area of the transparent portion 232 only occupies a part of that of the whole worktable 400. The skilled persons in this field know that the ratio of the area of the transparent portion 232 to the area of the whole upper surface 22 of the worktable 400 is able to change according to demands. For example, the area of the transparent portion 232 is configured to be identical with that of the upper surface of the worktable 400, thus, no matter where the operator is able to easily observe the state of the saw blade clamp assembly 14, and in the operation of replacing the saw blade 130, the event that the saw blade 130 is released by incorrect operation because the concrete position of the saw blade clamp assembly cannot be seen is avoided, and injury is also avoided. The tabletop of the working table 400 is partly or wholly made of a transparent material. Such design makes processing and manufacturing convenient and operation easy.

Figure 19:
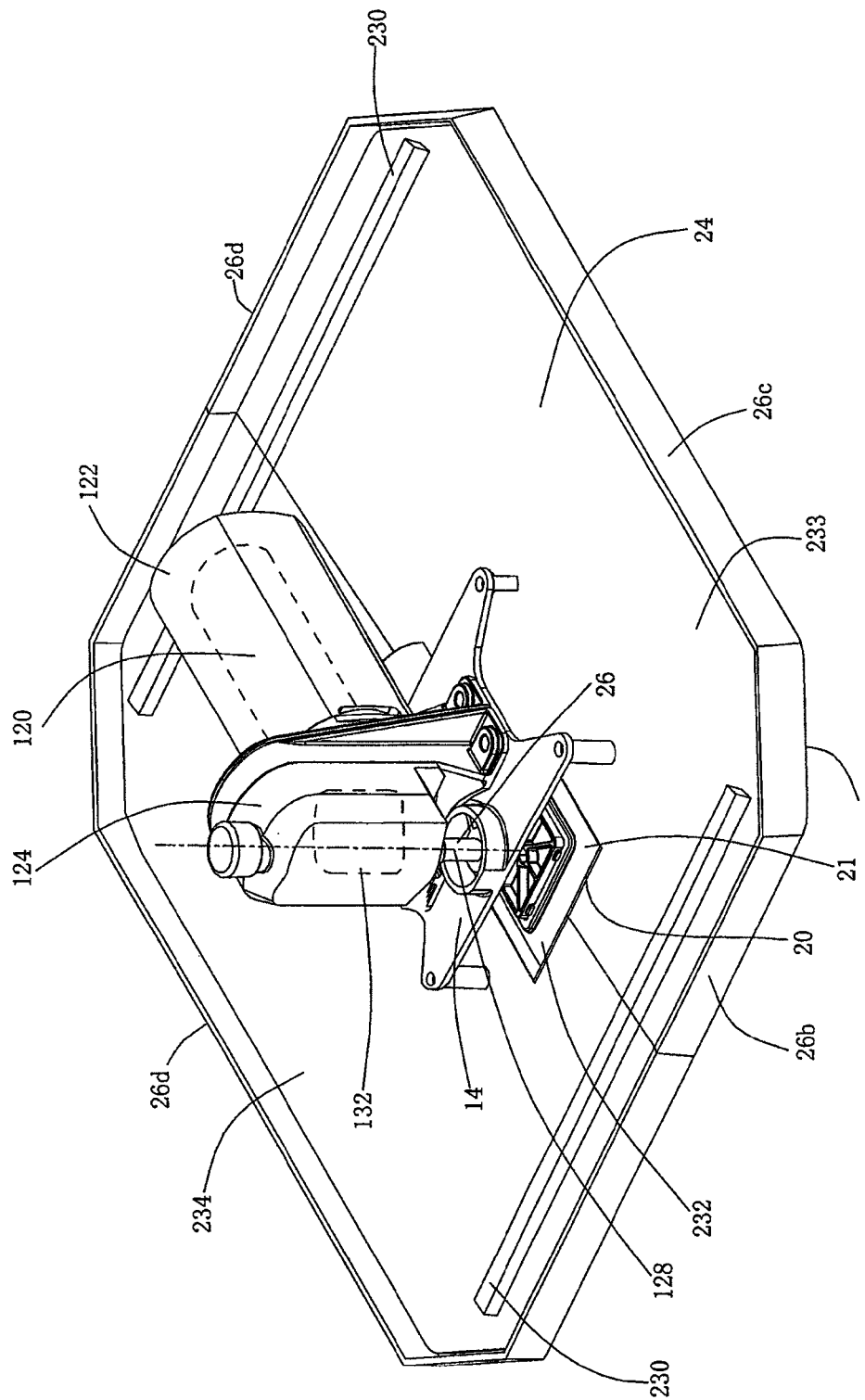
FIG. 19 is a schematic view of the cutting machine being turned in FIG. 18, wherein the supporting unit is removed.
Figure 20:
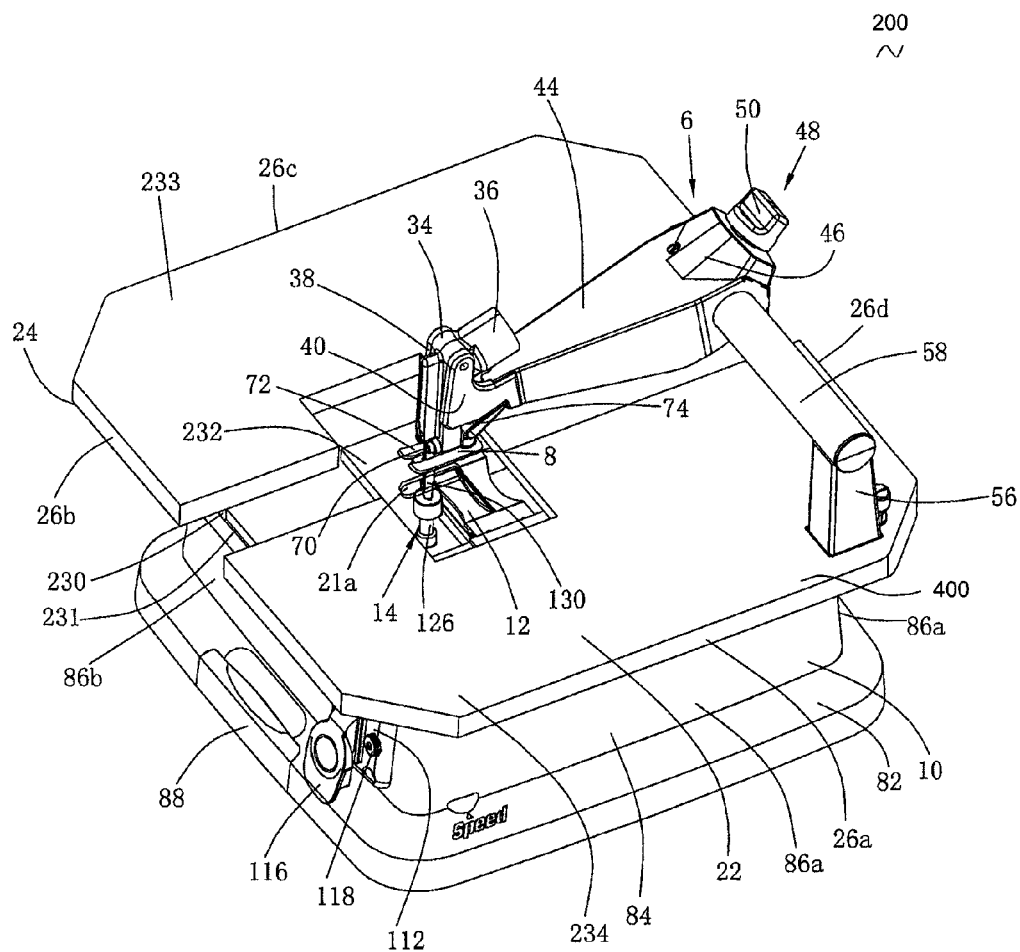
FIG. 20 is a schematic view of the cutting machine in FIG. 18, wherein the worktable of the cutting machine is open.
Figure 21:
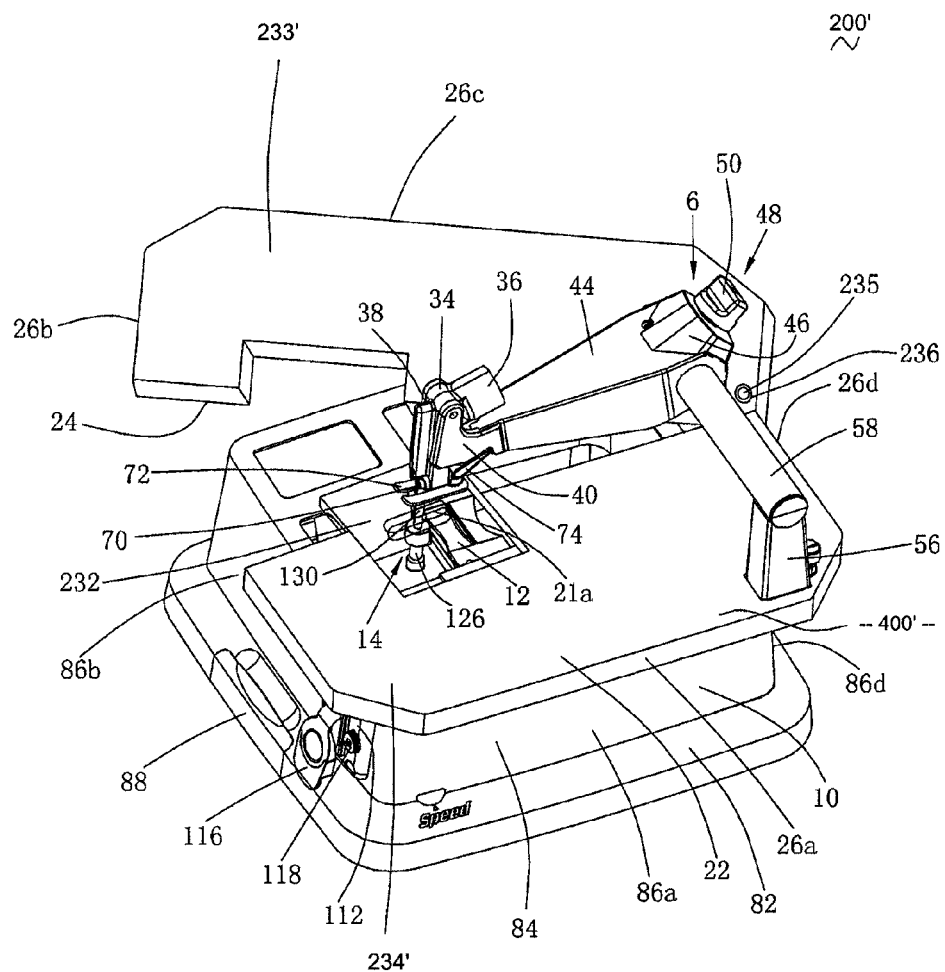
FIG. 21 is a schematic view of the cutting machine of the sixth embodiment according to the present invention, wherein the worktable is open.
Figure 22:
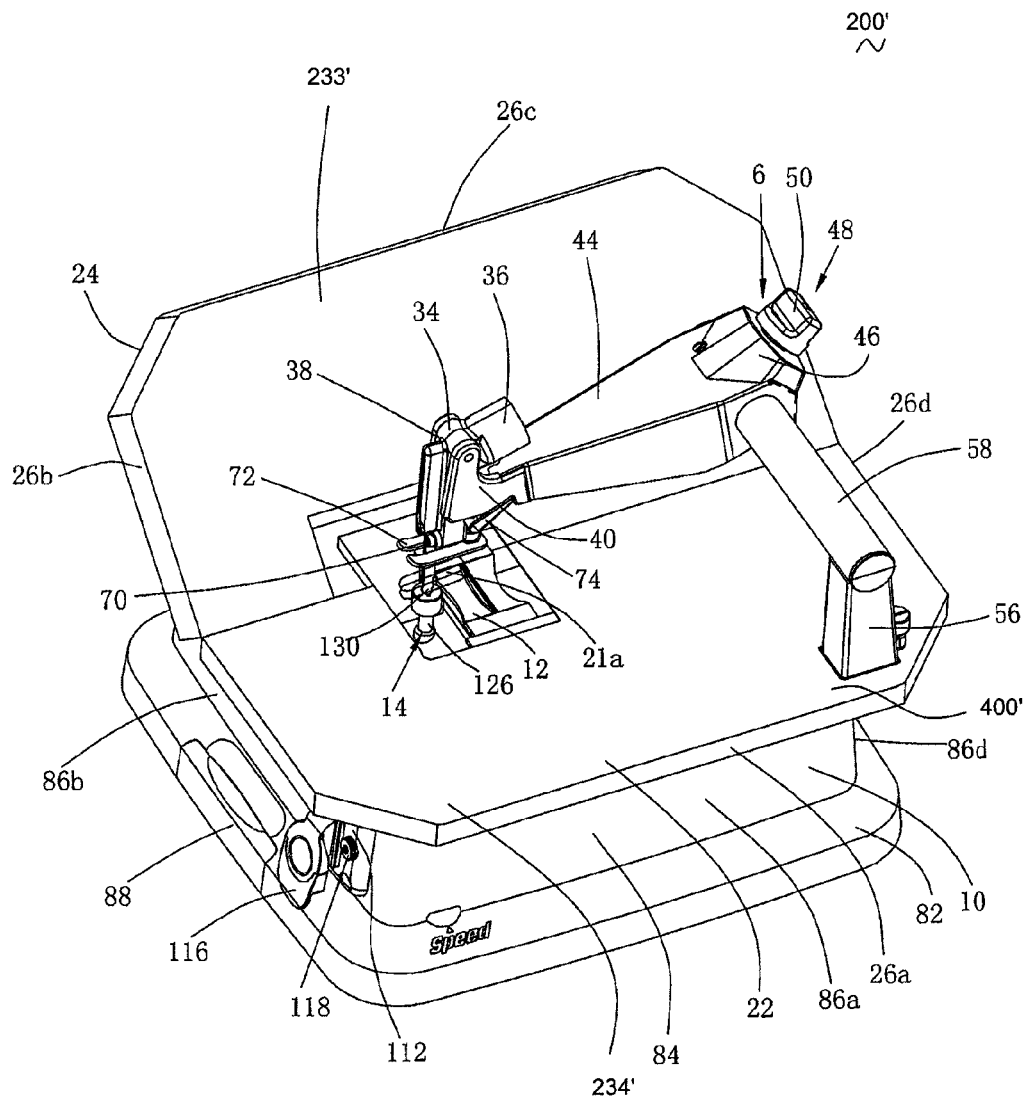
FIG. 22 is a schematic view of the cutting machine of the seventh embodiment according to the present invention, wherein the worktable is open.

To ensure that the operator contacts the saw blade clamp assembly 14 conveniently, the worktable 400 is configured to comprise two portions 233, 234 and the saw blade clamp assembly 14 is positioned between the boundary of the two portions. By separating the tabletop of the worktable, the saw blade clamp assembly 14 is located at the position where the operator is easily able to contact the saw blade clamp assembly 14 and is able to replace the saw blade without stooping. Concretely speaking, at least one portion of the worktable 400 is able to move with respect to the saw blade clamp 14 so that the saw blade clamp assembly 14 is positioned at be contacted directly. The worktable 400 as shown in FIG. 19 is provided with a guiding rail 230, and the supporting unit 10 connected to the worktable 400 is correspondingly provided with the sliding groove 231. The worktable 400 comprises two portions and at least one portion 233 is able to translate with respect to the saw blade clamp assembly 14. In this embodiment, the first portion 233 of the worktable 400 slides in the sliding groove 231 on the supporting unit 10 by means of the guiding rail 230 so as to move away from the saw blade clamp assembly 14. The extension directions of the sliding groove 231 and the guiding rail 230 are vertical to the boundary of the two portions of the worktable. The skilled persons in this field know that the positions of the guiding rail 230 and the sliding groove 231 are not limited to those in the schemes of the above embodiments and are capable of being exchanged to realize the movement of one portion of the worktable 400 with respect to the saw blade clamp assembly 14. The first portion 233 and the second portion 234 are able to move with respect to the saw blade clamp assembly 14 at the same time to accelerate separation of the two.

In this embodiment, the two portions 233, 234 of the worktable 400 are separated from the front sidewall 26a to the rear sidewall 26c of the worktable. The skilled persons in this field know that the worktable is capable of being separated along other surfaces. For example, the separating surface of the worktable extends to the position where the saw blade clamp assembly is positioned from the front sidewall 26a to the rear sidewall 26c or extends to the position where the saw blade clamp assembly is disposed from the right sidewall 26d to the left sidewall 26b. Therefore, the worktable 400 is divided into two portions, wherein the area of the first portion 233 close to the operation position of the operator is smaller than that of the second portion 234 away from the operation position of the operator. The first portion 233 is able to move with respect to the second portion 234, away from the saw blade clamp assembly 14. Due to small area of the moving portion and light weight of the corresponding worktable 400, the movement of the worktable is convenient and labor-saving.

The two portions of the worktable may have many separation directions, for example the direction from the rear sidewall to the front sidewall, the direction from the left sidewall to the right sidewall, or the direction from the saw blade clamp assembly to the intersection of the sidewall and the right sidewall, etc., which is just a piece of cake for the skilled persons in this field, so no more detailed description is provided.

The sixth embodiment of worktable 400' is described in details in combination with the attached drawing 21.

In this embodiment, the worktable 400' comprises two separable portions 233', 234'. At least one portion is able to rotate with respect to the saw blade clamp assembly 14; concretely speaking, the first portion 233' close to the operation position of the operator is provided with a pivot hole 236, which extends through the worktable 400' vertically, at a position of the rear sidewall, the supporting unit is provided with a shaft 235, and the first portion 233' of the worktable rotates around the shaft 235 to move away from the saw blade clamp assembly. An expansion space at a certain angle is formed between the first portion 233' and the second portion 234' of the worktable 400', so the operator is able to directly reach the saw blade clamp assembly 14 from the expansion space.

Of course, the pivot hole 236 and the shaft 235 in this embodiment are capable of being exchanged to realize the rotation of one portion of the worktable 400' with respect to the supporting unit 10 and the saw blade clamp assembly 14.

The seventh embodiment of a worktable 400" is described in details in combination with the attached drawing 22.

Like the above embodiment, the worktable 400" also comprises two separable portions 233", 234". At least one portion is able to rotate with respect to the saw blade clamp assembly 14. But the difference is that one portion of the worktable 400" turns with respect to the other portion in this embodiment. One portion of the worktable 400" is able to rotate, and the other portion is fixedly disposed with respect to the supporting unit 10. Therefore, one portion of the worktable turns at a certain angle with respect to the other portion of the worktable, so the upper surfaces of the two portions of the worktable are inclined at a certain angle, and the saw blade clamp assembly 14 is disposed at the position within reach.

The skilled persons in this field know that the supporting unit in the present invention is also capable of being made of the transparent material. Thus, the operator is able to observe the working state of the cutting machine from different positions, and no matter where the saw blade is replaced, the saw blade clamp assembly is ensured to be visible to make the saw blade replacement safe.

Certainly, the present invention is not only limited to the abovementioned embodiments. Any variation and replacement based on the present invention shall be within the protection scope of the present invention.

What is claimed is:

1. A cutting machine, comprising:
a worktable including an opening and an upper surface for supporting a workpiece;

a supporting unit supporting the worktable;
a cutting mechanism mounted on a lower surface of the worktable and contained within the supporting unit wherein the cutting mechanism comprises:
  a motor for outputting a rotation motion;
  a reciprocating rod for driving a saw blade for reciprocation through the opening;
  a motion conversion mechanism operably connecting the motor to the reciprocating rod for converting the rotation motion of the motor into a reciprocating motion of the reciprocating rod; and
a saw blade clamp assembly for clamping the saw blade to and releasing the saw blade from the reciprocating rod, characterized in that the saw blade clamp assembly comprises an operating element which is disposed on the upper surface of the worktable.

2. The cutting machine of claim 1, wherein the saw blade clamp assembly comprises a clamping wrench rotatable around a reciprocating rod axis of the reciprocating rod, a linkage mechanism is disposed between the operating element and the clamping wrench, and thus the operating element is operable to drive the clamping wrench to rotate.

3. The cutting machine of claim 2, wherein the linkage mechanism comprises a connecting plate connected to the operating element and rotating around a rotating axis which is parallel to the reciprocating rod axis, and an actuating element being connected to the connecting plate and driving the clamping wrench to rotate.

4. The cutting machine of claim 3, wherein the rotating axis of the connecting plate is parallel to the rotating axis of the actuating element.

5. The cutting machine of claim 4, wherein the rotating axis of the connecting plate rotates around the rotating axis of the actuating element.

6. The cutting machine of claim 5, wherein the actuating element comprises a rotating frame being disposed rotatable with respect to the reciprocating rod, the rotating frame comprises a C-shape base portion, a connecting shaft disposed at one end of the base portion, a vertical pushing column disposed at the other end of the base portion, and a connecting lug disposed between the ends of the base portion.

7. The cutting machine of claim 6, wherein the height of the pushing column is larger than a reciprocating travel of the reciprocating rod.

8. The cutting machine of claim 7, wherein a stop protrusion is disposed on the pushing column to, when the clamping wrench contacts with a biasing of the pushing column, prevent the clamping the wrench from leaving the biasing surface.

9. The cutting machine of claim 1, wherein the saw blade clamp assembly further comprises an elastic element biasing the operating element to move towards a clamping position for clamping the saw blade.

10. The cutting machine of claim 9, wherein the saw blade clamp assembly comprises a clamping wrench rotatable around a reciprocating rod axis of the reciprocating rod, an actuating element being connected to the operating element and driving the clamping wrench, the cutting mechanism comprises a gearbox housing, the elastic element is a torsion spring disposed between the actuating element and the gearbox housing, the torsion spring biasing the actuating element to rotate towards a clamping position for clamping the saw blade.

11. The cutting machine of claim 1, wherein the operating element is translationally movable relative to the worktable.

12. The cutting machine of claim 11, wherein a sliding groove is disposed on the worktable, the operating element comprises a sliding plate, the sliding plate is movable along the sliding groove between a releasing position for releasing the saw blade and a clamping position for clamping the saw blade.

13. The cutting machine of claim 12, wherein the operating element comprises an opening disposed on the sliding plate.

14. A reciprocating saw machine comprising:
  a table formed with a top surface configured with a through opening;
  a rotary motor mounted under the table;
  a reciprocating rod for driving a saw blade for reciprocation through the through opening;
  a converter operably connecting the rotary motor to the reciprocating rod for converting rotary to reciprocating motion;
  a clamp for clamping the saw blade to the reciprocating rod;
  an operating element capable of shifting between an actuating position and a release position to clamp and release the saw blade, respectively, wherein the operating element is disposed on the upper surface of the table; and
  a linkage operably connecting the operating element to the clamp, the linkage operative to drive the clamp to the actuating position or to the release position upon shifting of the operating element to the actuating position or to the release position, respectively.

* * * * *